(12) United States Patent
Kuroda et al.

(10) Patent No.: US 7,649,693 B2
(45) Date of Patent: Jan. 19, 2010

(54) ZOOM LENS AND IMAGE PICK-UP APPARATUS

(75) Inventors: Daisuke Kuroda, Kanagawa (JP); Masafumi Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 11/587,859

(22) PCT Filed: Feb. 15, 2006

(86) PCT No.: PCT/JP2006/302663
§ 371 (c)(1),
(2), (4) Date: Oct. 27, 2006

(87) PCT Pub. No.: WO2006/095544
PCT Pub. Date: Sep. 14, 2006

(65) Prior Publication Data
US 2008/0259464 A1    Oct. 23, 2008

(30) Foreign Application Priority Data
Mar. 11, 2005  (JP)  ............................ 2005-068932

(51) Int. Cl.
*G02B 15/14* (2006.01)
(52) U.S. Cl. .................. 359/676; 359/432; 359/773
(58) Field of Classification Search .............. 359/432, 359/676, 773
See application file for complete search history.

(56) References Cited

U.S. PATENT DOCUMENTS 5,691,851 A * 11/1997 Nishio et al. .............. 359/683

FOREIGN PATENT DOCUMENTS

| JP | 07-049453 | 2/1995 |
|----|-----------|--------|
| JP | 07-077656 | 3/1995 |

(Continued)

OTHER PUBLICATIONS

Supplemental European Search Report dated Jun. 16, 2008 for corresponding European Application No. 06 71 3804.

(Continued)

*Primary Examiner*—Joseph Martinez
(74) *Attorney, Agent, or Firm*—Rader, Fishman & Grauer PLLC

(57) ABSTRACT

A zoom lens including a broad picture angle of 60 to 100 degrees as a photographic picture angle of the wide-angle end state, and having a magnification ratio of about three to six times, small front gem diameter, excellent compactness and high image formation performance, which is used in a video camera or a digital still camera, and an image pick-up apparatus using such a zoom lens. A zoom lens (20), consisting of plural groups and serving to change group spacing or spacings to thereby perform a magnification changing or adjusting operation, comprises a first lens group GR1 having positive refractive power, a second lens group GR2 having negative refractive power and a third lens group GR3 having positive refractive power which are arranged in order from the object side, and a last group GRR arranged at the side closest to the image surface and having negative refractive power, wherein the first lens group GR1 is constituted by single positive lens G1, and satisfies the following conditional formulas.

$$0.5 < Y\mathrm{max}/FW < 1.3 \quad (1)$$

$$VdG1 > 40 \quad (2)$$

In the above formula,
Ymax: maximum image height on image pick-up surface;
FW: focal length at the wide-angle end state of the lens entire; and system
VdG1: Abbe number at d line of the first lens group GR1.

6 Claims, 17 Drawing Sheets

FOREIGN PATENT DOCUMENTS

| | | |
|---|---|---|
| JP | 07-151975 | 6/1995 |
| JP | 07-261084 | 10/1995 |
| JP | 07-261086 | 10/1995 |
| JP | 07-318805 | 12/1995 |
| JP | 09-005629 | 1/1997 |
| JP | 11-023969 | 1/1999 |
| JP | 2000-275522 | 10/2000 |
| JP | 2000-284176 | 10/2000 |
| JP | 2002-296500 | 10/2002 |
| WO | WO 02/057830 A1 | 7/2002 |

OTHER PUBLICATIONS

International Search Report, International Application No. PCT/JP2006/302663, date of actual completion: Apr. 13, 2006; date of mailing: Apr. 25, 2006.

* cited by examiner

ZOOM LENS AND IMAGE PICK-UP APPARATUS

TECHNICAL FIELD

The present invention relates to a novel zoom lens and a novel image pick-up apparatus. More particularly, the present invention relates to a zoom lens including a broad picture angle of 60 to 100 degrees as a photographic picture angle of the wide-angle end state, having a magnification ratio of about 3 to 6 times, small optical gem diameter, excellent compactness and high image formation performance, which is suitable for a photographic optical system of digital input/output equipment such as a digital still camera or a digital video camera, etc.; and an image pick-up apparatus comprising such a zoom lens.

This Application claims priority of Japanese Patent Application No. 2005-068932, field on Mar. 11, 2005, the entirety of which is incorporated by reference herein.

BACKGROUND ART

In recent years, image pick-up apparatuses using a solid-state image pick-up device such as a digital still camera are being popularized. Further, with popularization of digital still cameras, there is required a zoom lens having excellent compactness and having high image formation performance, while covering the range from a super-broad angle side up to the telescopic side by a single lens.

For example, in the zoom lens described in the Japanese Patent Application Laid Open No. 1995-261084 publication, a zoom lens configuration including a negative lens group as a preceding lens group is used to realize a broad angle of the zoom lens. However, in the zoom lens described in the Japanese Patent Application Laid Open No. 1995-261084 publication, the magnification ratio is small. The magnification of about two times or three times is a limit. Realization of high magnification is difficult.

On the other hand, in the zoom lenses described in the Japanese Patent Application No. 1997-5629 publication, and the Japanese Patent Application No. 1995-318805 publication, the zoom configuration including a positive lens group as the preceding lens group is used to realize high magnification of the zoom lens and broad angle thereof.

However, in the Japanese Patent Application Laid Open No. 1997-5629 publication and the Japanese Patent Application Laid Open No. 1995-318805 publication, a photographic picture angle of about 80 degrees is a limit. As a result, realization of a broader angle is difficult. Moreover, even if realization of a broader angle can be attained, the number of lenses constituting the first lens group having a large lens diameter is increased so that miniaturization is not sufficient, cost is increased and weight also becomes heavy. This is not preferable.

In view of the above, an object of the present invention is to provide a zoom lens including a broad picture angle of 60 to 100 degrees as a photographic picture angle of a wide-angle end state, and having a magnification ratio of about three to six times, small front optical gem diameter and excellent compactness, and high image formation performance, which is used in video camera or digital still camera; and an image pick-up apparatus comprising such zoom lens.

DISCLOSURE OF THE INVENTION

Problems to be Solved by the Invention

In order to solve the above-described problems, the zoom lens of the present invention consists of plural groups and serving to change group spacing or spacings to thereby perform a magnification changing or adjusting operation, and comprises a first lens group GR1 having positive refractive power, a second lens group GR2 having negative refractive power, a third lens group GR3 having positive refractive power which are arranged in order from the object side, and a last lens group GRR arranged at the side closest to the image surface and having negative refractive power, wherein the first lens group GR1 is constituted by single positive lens. When Ymax indicates the maximum image height on the image pick-up surface, FW indicates a focal length at the wide-angle end state of the lens entire system, and VdG1 indicates Abbe number at d line of the first lens group GR1, the following conditional formulas are satisfied.

$$0.5 < Ymax/FW < 1.3, \qquad (1)$$

$$VdG1 > 40. \qquad (2)$$

Moreover, in order to solve the above-mentioned problems, the image pick-up apparatus of the present invention comprises a zoom lens consisting of plural groups and serving to change group spacing or spacings to thereby perform a magnification changing or adjusting operation, and an image pick-up device for converting an optical image formed by the zoom lens into an electric signal, the zoom lens comprising a first lens group GR1 having positive refractive power, a second lens group GR2 having negative refractive power and a third lens group GR3 having positive refractive power which are arranged in order from the object side, and a last lens group GRR arranged at the side closest to the image surface and having negative refractive power, wherein the first lens group GR1 is constituted by a single positive lens, and when Ymax indicates the maximum image height on the image pick-up surface, FW indicates focal length at the wide-angle end state of the lens entire system, and VdG1 indicates Abbe number at d line of the first lens group GR1, the conditional formulas (1) 0.5<Ymax/FW<1.3 and (2) VdG1>40 are satisfied.

Accordingly, in the zoom lens of the present invention, a photographic picture angle at the wide-angle end state includes a broad picture angle of 60 to 100 degrees, the magnification ratio is about three to six times, the front gem diameter is small, compactness is excellent, and high image formation performance is provided. Moreover, since the image pick-up apparatus of the present invention comprises a zoom lens of the present invention, a photographing operation having a broad picture angle about of 60 to 100 degrees can be performed. Thus, a photographing operation by an arbitrary picture angle within a magnification ratio of three times to six times can be performed, and an image of high quality can be acquired by high performance image formation performance.

Accordingly, in the zoom lens of the present invention, it is possible to attain a magnification ratio of about three times to six times while including a broad picture angle of 60 to 100 degrees as a photographic picture angle of the wide-angle end state. Moreover, since an image is magnified or enlarged by the last lens group, the front gem of the first lens group GR1 can be constituted as a small-sized front gem. In addition, since a height of rays of marginal (peripheral) light passed through the first lens group GR1 at the telescopic end state can be lower than that of the ordinary zoom lens, the first lens group GR1 which has the greatest influence on axial color aberration can be constituted only by single lens. Thus, it is possible to attain miniaturization and/or light weight of the lens entire system while maintaining a picture angle of 60 to 100 degrees and a magnification ratio of about three times to six times.

Moreover, since the image pick-up of the present invention comprises the zoom lens of the present invention, a photographing operation having the broad picture angle of about 60 to 100 degrees can be performed although the image pick-up apparatus is small-sized and light in weight. As a result, a photographing operation by an arbitrary picture angle within the magnification ratio of three to six times can be performed. In addition, image of high quality can be acquired by high image formation performance.

In the inventions described in one aspect, since the first lens group GR1 satisfies the conditional formula (3) $2<F1/\sqrt{FW \cdot FT}<15$ when F1 is a focal length of the first lens group GR1, FT is a focal length at the telescopic end state of the lens entire system, and $\sqrt{FW \cdot FT}$ is the square root of a product of FW and FT, various aberrations including spherical aberration can be further satisfactorily corrected, and further miniaturization/light weight can be made.

In the inventions described in the another aspect, since the last lens group GRR includes a negative lens GRn at the side closest to the object and a positive lens GRp at the side closest to the image surface, and satisfies the conditional formulas (4) $1.2<\beta GRRT<1.8$, (5) $0.2<Twbf/FW<1.2$ and (6) $VdGRRn>VdGRRp$ when $\beta GRRT$ is the magnification at the telescopic end state of the last lens group GRR, Twbf is back focus (i.e., air conversion length) at the wide-angle end state, VdGRRn is the Abbe number at a d line of the negative lens GRn and VdGRRp is the Abbe number at a d line of the positive lens GRp, marginal rays of light are jumped upwards by the negative lens located at the side closest to the object side and are suppressed by the positive lens located at the side closest to the image surface at the last lens group GRR to thereby permit an incident angle onto the image pick-up device to be gentle or small, and to realize a high performance by miniaturization, high magnification and color aberration reduction. Moreover, at the wide-angle end state, the lens GRn at the side closest to the object and the lens GRp at the side closest to the object surface in the lens at the side closest to the object (constituting the first lens group GR1), the lens at the side closest to the object of the second lens group GR2 and the last lens group GRR has symmetry in the lens configuration, i.e., the relationship of positive, negative: negative, positive with an aperture diaphragm being put therebetween, thus making it possible to suppress distortion aberration while realizing broad angle.

In the inventions described in still another aspect, since at least one lens surface of the second lens group GR2 is constituted by a non-spherical surface, and the second lens group GR2 satisfies the conditional formula (7) $0.4<|F2/\sqrt{FW \cdot FT}|<1.0$ when F2 is a focal length of the second lens group GR2, chromatic aberration in the radial direction at the wide-angle end state can be effectively corrected, and miniaturization and realization of high performance can be attained at the same time.

In the inventions described in yet another feature, since the third lens group GR3 at least includes one positive lens and one negative lens, at least one lens plane surface is constituted by a non-spherical surface, and the third lens group GR3 satisfies the conditional formula (8) $VdGR3p>50$ when VdGR3p is an average value of Abbe numbers at a d line of the positive lens within the third lens group GR3, it is possible to suppress occurrence of color aberration to maintain high optical performance over the entire range. In addition, at least one lens plane surface is constituted by a non-spherical surface to thereby suppress occurrence of various aberrations such as spherical aberration and/or chromatic aberration, etc., thus making it possible to maintain high optical performance over the zooming range.

BEST MODE FOR CARRYING OUT THE INVENTION

Figure 1:
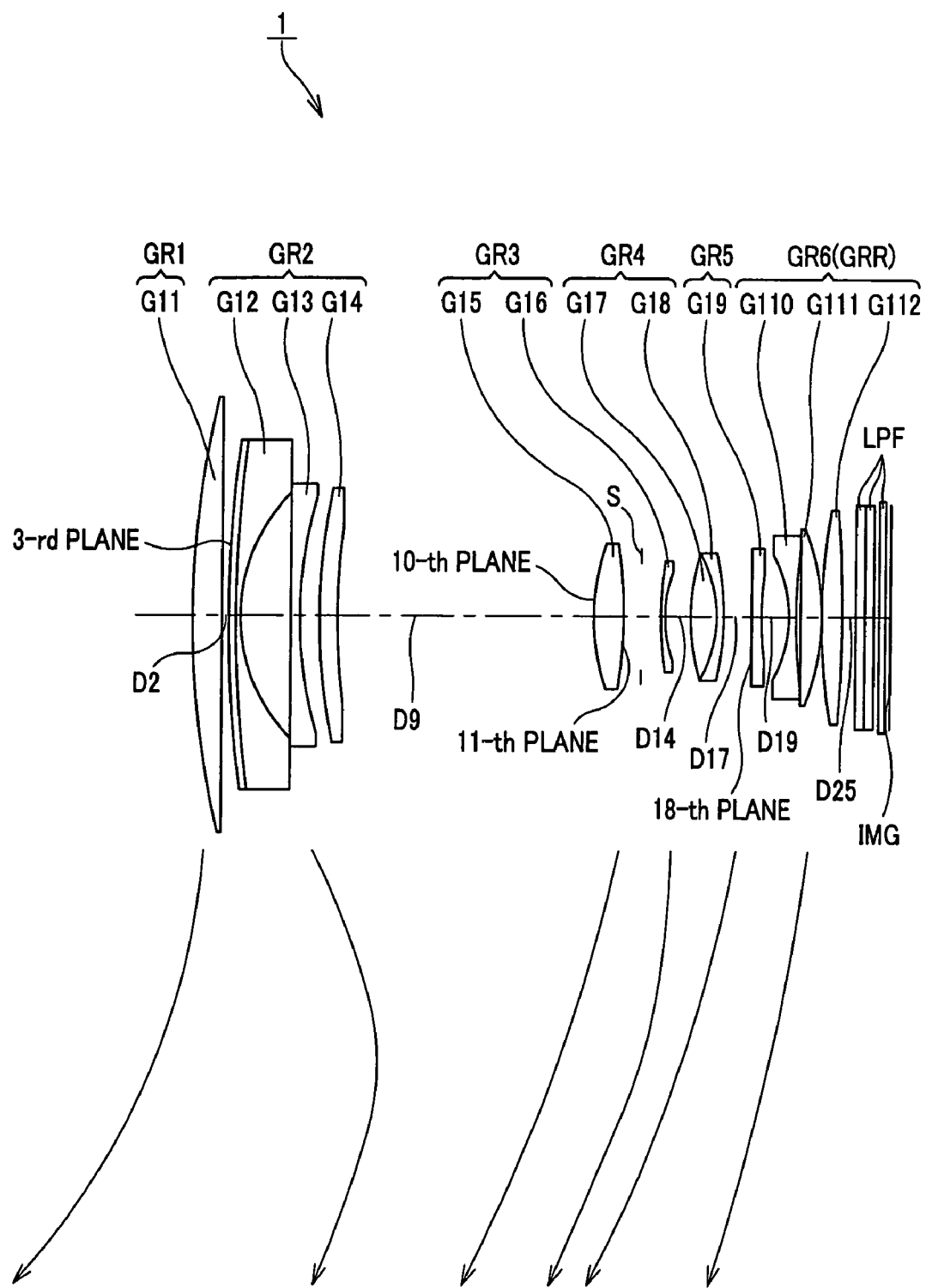
FIG. 1 is a view showing lens configuration of a first embodiment of a zoom lens of the present invention.

Best mode for carrying out the zoom lens and image pick-up apparatus of the present invention will now be explained with reference to the attached drawings.

The zoom lens of the present invention is directed to a zoom lens consisting of plural groups and serving to change group spacing or spacings to thereby perform a magnification changing or adjusting operation, and comprises a first lens group GR1 having positive refractive power, a second lens group GR2 having negative refractive power and a third lens group GR3 having positive refractive power which are arranged in order from the object side, and a last lens group GRR arranged at the side closest to the image surface and having negative refractive power, wherein the first lens group GR1 is constituted by a single positive lens, and satisfies the following conditional formulas (1), (2).

$$0.5 < Ymax/FW < 1.3 \quad (1)$$

$$VdG1 > 40 \quad (2)$$

In the above formula,
Ymax: maximum image height on an image pick-up surface
FW: focal length at the wide-angle end state of the entire lens system; and
VdG1: Abbe number at a d line of the first lens group GR1

Accordingly, in the zoom lens of the present invention, it is possible to attain a magnification ratio of about three times to six times while including a broad picture angle of 60 to 100 degrees as a photographic picture angle of the wide-angle end state. Moreover, since the image is magnified or enlarged by the last lens group GRR, the front optical gem diameter of the first lens group GR1 can be constituted as a miniaturized configuration, and a height of the marginal (i.e., peripheral) rays of light passed through the first lens group GR1 serving as a positive lens group at the telescopic end state can be reduced as compared to the ordinary zoom lens. For this reason, the first lens group GR1 which has the greatest influence on the axial color aberration can be constituted by only a single positive lens. Further, miniaturization and light weight of the lens entire system can be attained while maintaining a picture angle of 60 to 100 degrees, and a magnification ratio of about three times to six times.

The conditional formula (1) prescribes a ratio between the maximum image height on the image pick-up surface and the focal length at the wide-angle end state of the entire lens system.

When the value of Ymax/FW is 0.5 or less, i.e., there results a telescopic state, a positive power of the first lens group GR1 becomes too strong. As a result, the influence of axial color aberration at the telescopic side becomes too strong so that correction cannot be made only by single lens. Moreover, when the value of Ymax/FW is 1.3 or more, i.e., there results a broad angle state, and a positive power of the first lens group GR1 becomes too weak. As a result, the effective diameter of the first lens group GR1 becomes large so that miniaturization and light weight become difficult.

Preferably, it is desirable to satisfy the range of 0.8<Ymax/FW<1.20.

The conditional formula (2) prescribes occurrence quantity of color aberrations of the first lens group serving as positive single lens. In the case where VdG1 is 40 or less, the influence of the axial color aberration at the telescopic side becomes too great. Correction of this phenomenon becomes difficult also at the entirety of the lens system. Preferably, it is desirable to satisfy the range of VdG1>55.

It is desirable that the first lens group GR1 satisfies the following conditional formula (3).

$$2 < F1/\sqrt{FW \cdot FT} < 15 \quad (3)$$

In the above formula,
F1: focal length of the first lens group GR1;
FT: focal length at the telescopic end state of the entire lens system; and
$\sqrt{FW \cdot FT}$: square root of the product of FW and FT.

The conditional formula (3) prescribes a ratio between the focal length of the first lens group GR1 having a positive refractive power constituted by a positive single lens and the focal length of the intermediate area in the entire lens system. In the case where $F1/\sqrt{FW \cdot FT}$ is 2 or less, the refractive power of the first lens group GR1 becomes too strong. As a result, the influence of various aberrations including spherical aberration becomes large. Correction of such phenomenon becomes difficult even at the entire lens system. Moreover, in the case where $F1/\sqrt{FW \cdot FT}$ is 15 or more, the refractive power of the first lens group GR1 becomes too weak. As a result, realization of a high magnification becomes difficult, and miniaturization/light weight also become difficult.

It is desirable that the last lens group GRR includes a negative lens GRn at the side closest to the object, and a positive lens GRp at the side closest to the image surface, and satisfies the following conditional formulas (4), (5) and (6).

$$1.2 < \beta GRRT < 1.8 \quad (4)$$

$$0.2 < Twbf/FW < 1.2 \quad (5)$$

$$VdGRRn > VdGRRp \quad (6)$$

In the above formula,
βGRRT: magnification at the telescopic end state of the last lens group GRR;
Twbf: back focus (i.e., air conversion length) at the wide-angle end state;
VdGRRn: Abbe number at a d line of the negative lens GRn; and
VdGRRp: Abbe number at a d line of the positive lens GRp.

The last lens group GRR includes negative lens GRn at a side closest to the object and a positive lens GRp at the side closest to the image surface to thereby jump upward marginal rays of light by the negative lens GRn and to suppress them by the positive lens GRp, thus permitting an incident angle onto the image pick-up device of marginal rays of light to be gentle or small. Moreover, at the wide-angle end state, the lens GRn at the side closest to the object and the lens GRp at the side closest to the image surface in the lens at the side closest to the object (constituting the first lens group GR1), the lens at the side closest to the second lens group GR2 and the last lens group GRR have symmetry in the lens configuration, i.e., the relationship of positive, negative: negative, positive with aperture diaphragm being put therebetween, thus to have an ability to suppress a distortion aberration while performing a realization of a broad angle.

The conditional formula (4) prescribes magnification at the telescopic end state of the last lens group GRR. In the case where βGRRT is 1.2 or less, magnification by the last lens group GRR is reduced. As a result, not only the first lens group serving as the front optical gem is enlarged, but also a height of rays of light passed through the first lens group GR1 at the telescopic end state also becomes high. Thus, the influence of axial color aberration and/or spherical aberration, etc. become large so that it becomes impossible to maintain the performance only by a single lens. On the other hand, in the case where βGRRT is 1.8 or more, magnification by the last lens group GRR becomes large. Although it is advantageous to miniaturization/light weight, various aberrations left at the lens groups before the last lens group GRR would be increased. As a result, realization of high performance and assembling accuracy also becomes rigorous.

The conditional formula (5) prescribes a ratio between BF (back focus) length at the wide-angle end state and focal length of the lens entire system at the wide-angle end state. Namely, in the case where the value of Twbf/FW is 0.2 or less, a LPF (Low-Pass Filter) and/or IR (Infrared) cut glass becomes extremely close to the image pick-up surface. As a result, a defect of the LPF or the IR cut glass and/or dust attached thereto are apt to become conspicuous at the time of minimum iris. Moreover, in the case where value of Twbf/FW is 1.2 or more, the lens front gem becomes large. As a result, not only miniaturization becomes difficult, but also realization of broad angle becomes difficult.

The conditional formula (6) prescribes an occurrence quantity of color aberrations of the last lens group GRR. When this condition is not satisfied, the occurrence quantity of magnification color aberrations at the last group becomes large. Correction of such occurrence quantity becomes difficult even at the lens entire system.

It is desirable that at least one lens surface of the second lens group GR2 is constituted by a non-spherical surface, and the second lens group GR2 satisfies the following conditional formula (7).

$$0.4<|F2/\sqrt{FW\cdot FT}|<1.0 \qquad (7)$$

In the above formula,

F2: focal length of the second lens group GR2.

The second lens group GR2 is caused to have at least one non-spherical surface to thereby have ability to effectively correct chromatic aberration in the radial direction at the wide-angle end state. Thus, miniaturization and high performance can be attained at the same time.

The conditional formula (7) prescribes ratio between a focal length of the second lens group GR2 having a negative refractive power and a focal length within the intermediate area in the lens entire system. In the case where F2/√FW·FT is 0.4 or less, the refractive power of the second lens group GR2 becomes too strong. Thus, a correction of image surface bending or curvature or marginal chromatic aberration becomes difficult. Moreover, in the case where F1/√FW·FT is 1.0 or more, the refractive power of the second lens group GR2 becomes too weak. As a result, a realization of high magnification becomes difficult, or the movable range of the second lens group GR2 for the purpose of obtaining a predetermined magnification becomes large so that miniaturization would become difficult.

It is desirable that the third lens group GR3 has at least one positive lens and one negative lens, and at least one lens plane surface of respective lens planes or plane surfaces is constituted by a non-spherical surface and the third lens group GR3 satisfies the following conditional formula (8).

$$VdGR3p>50 \qquad (8)$$

In the above formula,

VdGR3p: average value of Abbe numbers at a d line of the positive lens within the third lens group GR3

Thus, occurrence of a color aberration is suppressed thus to have ability to maintain high optical performance over the entire range. Moreover, at least one plane or plane surface of a lens respective plane surfaces constituting the third lens group GR3 is constituted by non-spherical surface. Thus, an occurrence of various aberrations such as spherical aberration or chromatic aberration, etc. are suppressed thus to have ability to maintain high optical performance over the entire zooming range.

It is desirable that at least one plane or plane surface of respective planes of lenses constituting the last lens group GRR is constituted by non-spherical surface. This is because it is thus possible to effectively correct distortion aberration or image surface bending or curvature at the peripheral area.

In addition, it is most desirable that the zoom lens of the present invention has a magnification ratio of about four times five times in order to simultaneously attain realization of broad angle and compactness.

Four embodiments of the zoom lens of the present invention and numeric value embodiments in which practical numeric values are applied to these embodiments will now be explained with reference to FIGS. 1 to 16 and Tables 1 to 13.

It is to be noted that while a non-spherical surface is used in the respective embodiments, the non-spherical shape is represented by the following formula (1).

[Formula 1]

$$x = \frac{y^2 \cdot c^2}{1+(1-(1+K)\cdot y^2 \cdot c^2)^{1/2}} + \sum A^i \cdot y^i \qquad (1)$$

In the above formula, y: height in a direction perpendicular to the optical axis;

x: distance in the optical axis direction from lens plane surface summit point;

c: paraxial curvature at lens summit point;

k: conic constant; and $A^i$: the i-th non-spherical coefficient.

FIG. 1 shows the lens configuration by the first embodiment 1 of the zoom lens system of the present invention, wherein there are arranged, in order from the object side, a first lens group GR1 having positive refractive power, a second lens group GR2 having negative refractive power, a third lens group GR3 having positive refractive power, a fourth lens group GR4 having positive refractive power, a fifth lens group GR5 having negative refractive power, and a sixth lens group GR6 having negative refractive power. Further, in a magnification changing or adjusting operation from the wide-angle end state up to the telescopic end state, respective lens groups are moved on the optical axis as indicated by arrowed of solid lines in FIG. 1.

The first lens group GR1 is comprised of a single lens G11 having positive refractive power. The second lens group GR2 is composed of a negative lens G12 having composite non-spherical surface at the object side, a negative lens G13, and a positive lens G14. The third lens group GR3 is composed of a positive lens G15 having non-spherical surfaces at both surface sides, an iris S, and a negative lens G16. The fourth lens group GR4 is comprised of a connection lens of a positive lens G17 and a negative lens G18. The fifth lens group GR5 is comprised of a negative lens G19 having a non-spherical surface at the object side. The sixth lens group GR6 is composed of a negative lens G110, a positive lens G111, and a positive lens G112.

Moreover, in the first embodiment and the second, third and fourth embodiments which will be described later, a parallel plane surface plate-shaped low-pass filter LPF is disposed between the last lens plane surface and the image pick-up surface IMG. It is to be noted that, as the above-mentioned low-pass filter LPF, there may be applied a double refraction type low-pass filter using, as material, quartz, etc. in which a crystallization axis is adjusted in a predetermined direction, and/or a phase type low-pass filter for attaining a required optical cut-off frequency characteristic by a diffraction effect.

Values of various elements of a numerical value embodiment 1 in which practical numerical values are applied to the first embodiment are shown in Table 1. The plane No. in various element Tables of the numerical value embodiment 1 and respective numerical value embodiments which will be explained later indicates the i-th plane from the object side, R indicates a radius of curvature of the i-th plane, D indicates an axial spacing between the i-th plane and the (i+1)-th plane, Nd indicates a refractive index with respect to a d line ($\lambda$=587.6 nm) of nitric material having the i-th plane at the body side, and Vd indicates Abbe number with respect to a d line of nitric material having the i-th plane at the object side. Moreover, a plane indicated by "ASP" indicates a non-spherical surface. Radius of curvature "INFINITY" indicates a plane.

TABLE 1

| PLANE No. | R | | D | Nd | Vd |
|---|---|---|---|---|---|
| 1 | 79.293 | | 5.384 | 1.4875 | 70.441 |
| 2 | 22777.974 | | variable | | |
| 3 | 606.965 | ASP | 0.200 | 1.5361 | 41.200 |
| 4 | 147.526 | | 1.500 | 1.8350 | 42.984 |
| 5 | 19.773 | | 7.766 | | |
| 6 | 47107.787 | | 1.100 | 1.8350 | 42.984 |
| 7 | 34.902 | | 3.657 | | |
| 8 | 49.228 | | 3.258 | 1.9229 | 20.884 |
| 9 | 805.396 | | variable | | |
| 10 | 16.118 | ASP | 4.157 | 1.5831 | 59.460 |
| 11 | −62.255 | ASP | 3.443 | | |
| IRIS | INFINITY | | 3.000 | | |
| 13 | 28.928 | | 0.900 | 1.9229 | 20.884 |
| 14 | 14.588 | | variable | | |
| 15 | 25.650 | | 4.511 | 1.4970 | 81.608 |
| 16 | −10.988 | | 0.900 | 1.7292 | 54.674 |
| 17 | −19.579 | | variable | | |
| 18 | −199.771 | ASP | 1.600 | 1.5831 | 59.460 |
| 19 | 184.409 | | variable | | |
| 20 | −12.900 | | 1.000 | 1.8340 | 37.345 |
| 21 | 89.461 | | 0.703 | | |
| 22 | 1121.947 | | 3.379 | 1.5814 | 40.888 |
| 23 | −23.344 | | 0.200 | | |
| 24 | 50.317 | | 2.956 | 1.9229 | 20.884 |
| 25 | −147.936 | | variable | | |
| 26 | INFINITY | | 1.200 | 1.5168 | 64.198 |
| 27 | INFINITY | | 1.620 | 1.5523 | 63.424 |
| 28 | INFINITY | | 1.000 | | |

TABLE 1-continued

| PLANE No. | R | D | Nd | Vd |
|---|---|---|---|---|
| 29 | INFINITY | 0.500 | 1.5567 | 58.649 |
| 30 | INFINITY | 1.000 | | |
| i | INFINITY | 0.000 | | |

In accordance with change of the lens position state from the broad angle end state up to the telescopic end state, a spacing D2 between the first lens group GR1 and the second lens group GR2, spacing D9 between the second lens group GR2 and the third lens group GR3, spacing D14 between the third lens group GR3 and the fourth lens group GR4, spacing D17 between the fourth lens group GR4 and the fifth lens group GR5, spacing D19 between the fifth lens group GR5 and the sixth lens group GR6, and spacing D25 between the sixth lens group GR6 and the low-pass filter LPF are changed. In view of the above, various values at the wide-angle end state of the respective spacings, an intermediate focal length between the wide-angle end state and the telescopic end state, and the telescopic end state are shown in Table 1 along with focal length f, F number Fno. and half picture angle $\omega$.

TABLE 2

| f | 14.73 | 32.05 | 69.71 |
|---|---|---|---|
| Fno. | 2.88 | 3.78 | 4.94 |
| $\omega$ | 42.31 | 21.60 | 10.35 |
| D2 | 1.000 | 21.962 | 52.715 |
| D9 | 41.120 | 14.134 | 1.000 |
| D14 | 4.243 | 4.949 | 7.390 |
| D17 | 4.647 | 3.942 | 1.500 |
| D19 | 4.556 | 8.026 | 13.707 |
| D25 | 2.500 | 10.508 | 21.754 |

Respective lens plane surfaces of the third plane, the 10-th plane, the 11-th plane and the 18-th plane are constituted by a non-spherical surface, and non-spherical coefficients are shown in Table 3. It is to be noted that, in the Table 3 and Tables indicating non-spherical coefficients, "$E^{-i}$" represents exponential representation having 10 as base, i.e., "$10^{-i}$". For example, "0.12345E-05" represents "$0.12345 \times 10^{-5}$".

TABLE 3

| PLANE No. | K | $A^4$ | $A^6$ | $A^8$ | $A^{10}$ |
|---|---|---|---|---|---|
| 3 | 0.000E+00 | 9.455E−06 | −1.520E−08 | 1.95E−11 | −1.38E−14 |
| 10 | 0.000E+00 | −2.379E−05 | −2.911E−08 | −1.48E−11 | −3.23E−13 |
| 11 | 0.000E+00 | 1.668E−05 | −1.816E−09 | 3.62E−11 | 0.00E+00 |
| 18 | 0.000E+00 | 2.362E−05 | 7.530E−08 | 8.09E−10 | −4.70E−12 |

Figure 2:
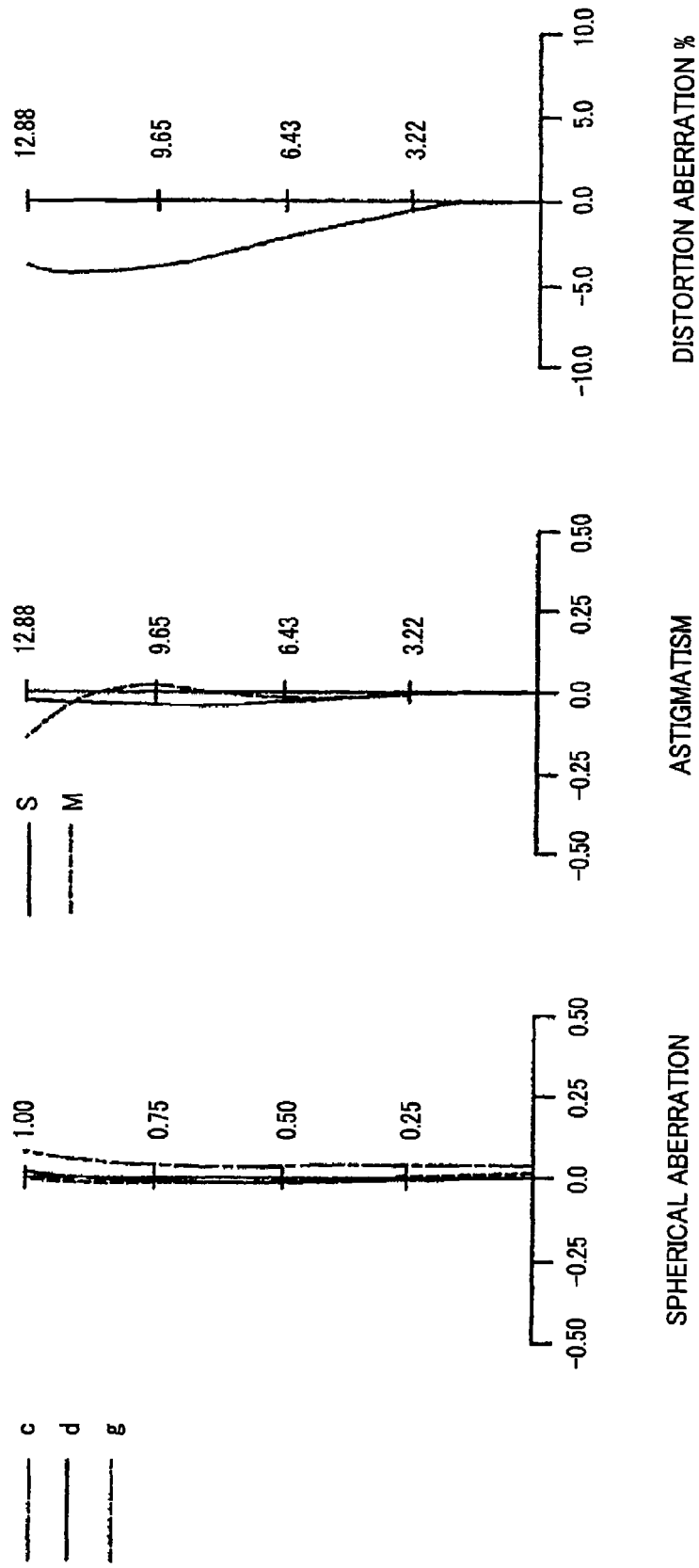
FIG. 2 shows, together with FIGS. 3 and 4, various aberration diagrams of a numerical value embodiment 1 in which practical numerical values are applied to the first embodiment of the zoom lens of the present invention, and this Figure shows spherical aberration, astigmatism and distortion aberration at the wide-angle end state.
Figure 3:
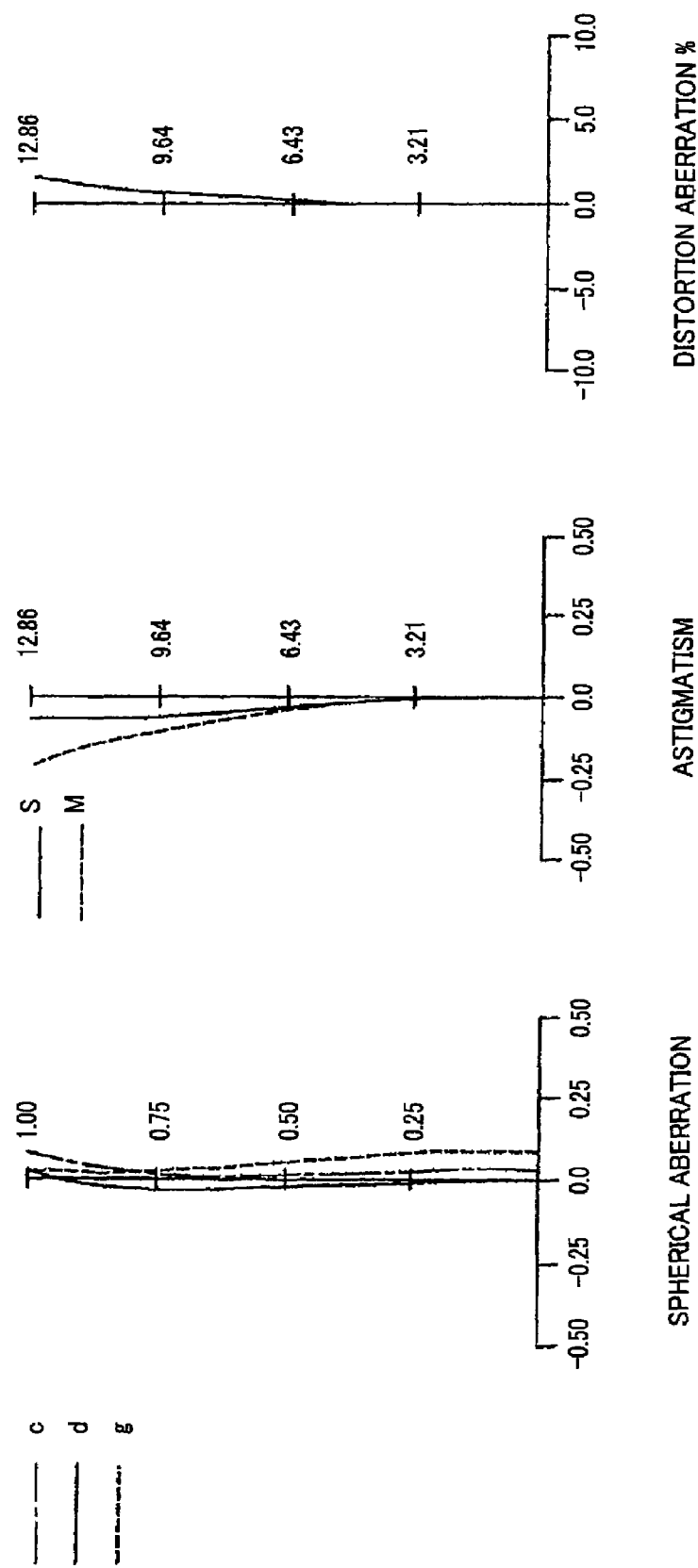
FIG. 3 shows spherical aberration, astigmatism and distortion aberration at intermediate focal length.
Figure 4:
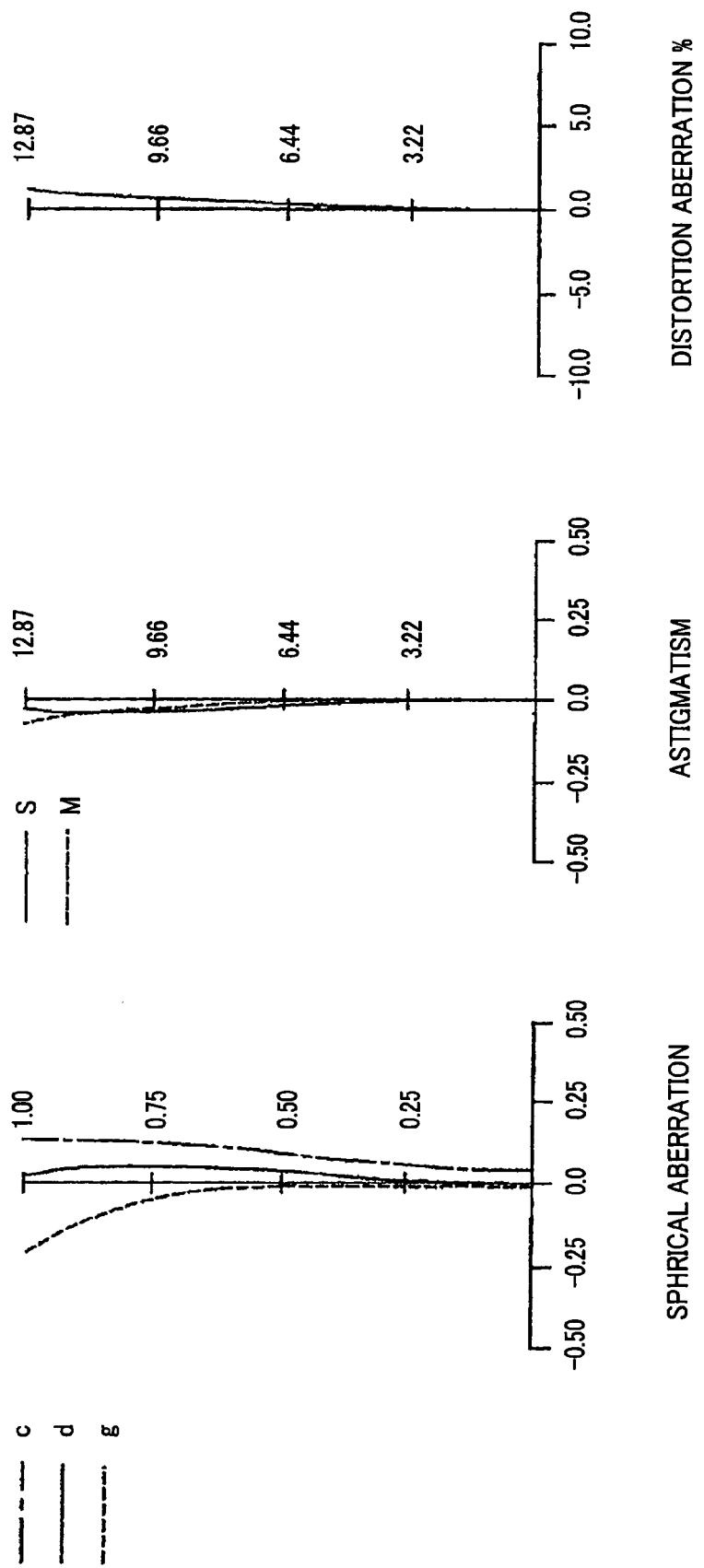
FIG. 4 shows spherical aberration, astigmatism and distortion aberration at the telescopic end state.

Various aberration diagrams in the infinity far in-focus state of the numeric value embodiment 1 are respectively shown in FIGS. 2 to 4. FIG. 2 shows various aberration diagrams at the wide-angle end state (f=14.73), FIG. 3 shows various aberration diagrams at the intermediate focal length (f=32.05) between the wide-angle end state and the telescopic end state, and FIG. 4 shows various aberration diagrams at the telescopic end state (f=69.71).

In the respective aberration diagrams of FIGS. 2 to 4, in the case of spherical aberration, a ratio with respect to open F value is taken on the ordinate and defocus is taken on the abscissa, wherein a solid line indicates a d line, a single-dotted lines indicate C line, and dotted lines indicate spherical aberration. In the case of astigmatism, the ordinate indicates image height, the abscissa indicates focus, the solid line S indicates a sagittal image surface, and dotted lines M indicate meridional image surface. In the case of distortion aberration, the ordinate indicates image height and the abscissa indicates %.

In the above-mentioned numerical value embodiment 1, as shown in the Table 13 which will be described later, the conditional formulas (1) to (8) are satisfied. Moreover, as shown in the respective aberration diagrams, respective aberrations are all corrected in a well balanced manner at the wide-angle end state, the intermediate focal length between the wide-angle end state and the telescopic end state, and the telescopic end state.

Figure 5:
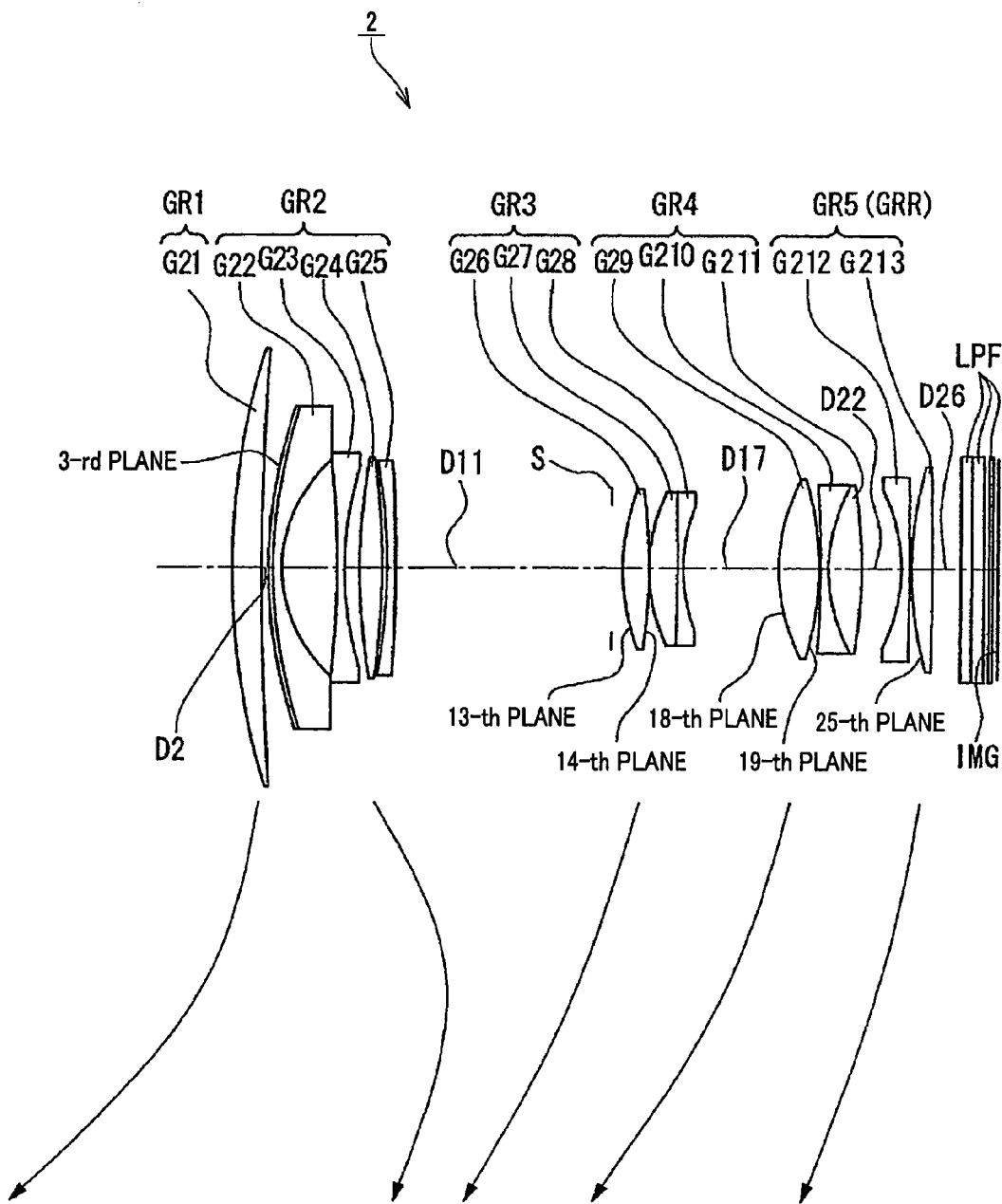
FIG. 5 is a view showing lens configuration of a second embodiment of the zoom lens of the present invention.

FIG. 5 shows the lens configuration by the second embodiment 2 of the zoom lens of the present invention, wherein there are arranged, in order from the object side, first lens group GR1 having positive refractive power, second lens group GR2 having negative refractive power, third lens group GR3 having positive refractive power, fourth lens group GR4 having positive refractive power, and fifth lens group GR5 having negative refractive power. Further, in a magnification changing or adjusting operation from the wide-angle end state up to the telescopic end state, respective lens groups are moved on the optical axis as indicated by arrowed travel lines in FIG. 5.

The first lens group GR1 is comprised of a single lens G21 having positive refractive power. The second lens group GR2 is composed of a negative lens G22 having a composite non-spherical surface at the object side, a negative lens G23, a positive lens G24, and a negative lens G25. The third lens group GR3 is composed of an iris S, a positive lens G26 having non-spherical surfaces at both surfaces, and a connection lens of a positive lens G27 and a negative lens G28. The fourth lens group GR4 is composed of a positive lens G29 having non-spherical surfaces at the both surfaces, and a connection lens of a negative lens G210 and a positive lens G211. The fifth lens group GR5 is composed of a positive lens G213 having non-spherical surface at the object side.

Values of various elements of the numerical value embodiment 2, in which practical numerical values are applied to the above-mentioned second embodiment are shown in Table 4.

TABLE 4

| PLANE NO. | R | | D | Nd | Vd |
|---|---|---|---|---|---|
| 1 | 79.571 | | 5.274 | 1.4875 | 70.441 |
| 2 | 335.075 | | variable | | |
| 3 | 92.312 | ASP | 0.300 | 1.5273 | 42.315 |
| 4 | 56.834 | | 1.800 | 1.8350 | 42.984 |
| 5 | 17.052 | | 9.817 | | |
| 6 | −88.533 | | 1.200 | 1.8350 | 42.984 |
| 7 | 39.682 | | 2.614 | | |

TABLE 4-continued

| PLANE NO. | R | | D | Nd | Vd |
|---|---|---|---|---|---|
| 8 | 60.327 | | 3.853 | 1.9229 | 20.884 |
| 9 | −82.616 | | 1.214 | | |
| 10 | −49.685 | | 1.200 | 1.7292 | 54.674 |
| 11 | −169.164 | | variable | | |
| IRIS | INFINITY | | 2.000 | | |
| 13 | 23.533 | ASP | 4.514 | 1.5831 | 59.460 |
| 14 | −43.767 | ASP | 0.279 | | |
| 15 | 22.946 | | 4.838 | 1.4970 | 81.608 |
| 16 | −119.965 | | 1.000 | 1.8340 | 37.345 |
| 17 | 19.175 | | variable | | |
| 18 | 19.524 | ASP | 7.171 | 1.4875 | 70.441 |
| 19 | −27.555 | ASP | 0.300 | | |
| 20 | −94.179 | | 1.200 | 1.8350 | 42.984 |
| 21 | 18.000 | | 6.086 | 1.4875 | 70.441 |
| 22 | −48.007 | | variable | | |
| 23 | −18.094 | | 1.200 | 1.8042 | 46.503 |
| 24 | −236.068 | | 0.500 | | |
| 25 | 37.222 | ASP | 3.500 | 1.8467 | 23.785 |
| 26 | −315.162 | | variable | | |
| 27 | INFINITY | | 2.000 | 1.5168 | 64.198 |
| 28 | INFINITY | | 2.000 | 1.5523 | 63.424 |
| 29 | INFINITY | | 1.000 | | |
| 30 | INFINITY | | 0.500 | 1.5567 | 58.649 |
| 31 | INFINITY | | 1.000 | | |
| i | INFINITY | | 0.000 | | |

In accordance with a change of the lens position state from the wide-angle end state up to the telescopic end state, spacing D2 between the first lens group GR1 and the second lens group GR2, spacing D11 between the second lens group GR2 and the third lens group GR3, spacing D17 between the third lens group GR3 and the fourth lens group GR4, spacing D22 between the fourth lens group GR4 and the fifth lens group GR5, and spacing 26 between the fifth lens group GR5 and the low-pass filter LPF are changed. In view of the above, respective values at the wide-angle end state of the respective spacings, the intermediate focal length between the wide-angle end state and the telescopic end state, and the telescopic end state are shown in Table 5 along with focal length f, F number Fno. and half picture angle ω.

TABLE 5

| f | 14.42 | 31.37 | 68.25 |
|---|---|---|---|
| Fno. | 2.85 | 3.65 | 5.03 |
| ω | 45.73 | 24.45 | 11.79 |
| D2 | 1.200 | 27.771 | 51.410 |
| D11 | 38.353 | 14.834 | 1.500 |
| D17 | 17.025 | 15.273 | 9.161 |
| D22 | 7.062 | 11.760 | 24.506 |
| D26 | 5.000 | 16.739 | 27.064 |

Respective lens plane surfaces of the third plane, the 13-th plane, the 14-th plane, the 18-th plane and the 25-th plane are each constituted by a non-spherical surface, and non-spherical coefficients are as shown in Table 6.

TABLE 6

| PLANE No. | K | $A^4$ | $A^6$ | $A^8$ | $A^{10}$ |
|---|---|---|---|---|---|
| 3 | 0.000E+00 | 1.213E−05 | −1.781E−08 | 2.95E−11 | −2.34E−14 |
| 13 | 0.000E+00 | −1.187E−05 | 2.76E−09 | −6.87E−11 | 2.13E−13 |
| 14 | 0.000E+00 | 5.237E−06 | 6.974E−09 | −7.76E−12 | 0.00E+00 |
| 18 | 0.000E+00 | −1.161E−05 | −3.59E−08 | 3.16E−11 | −3.20E−13 |
| 19 | 0.000E+00 | 1.105E−05 | 3.13E−09 | 1.89E−11 | 0.00E+00 |
| 25 | 0.E+00 | −1.16E−05 | 2.10E−08 | −8.05E−11 | 3.29E−13 |

Figure 6:
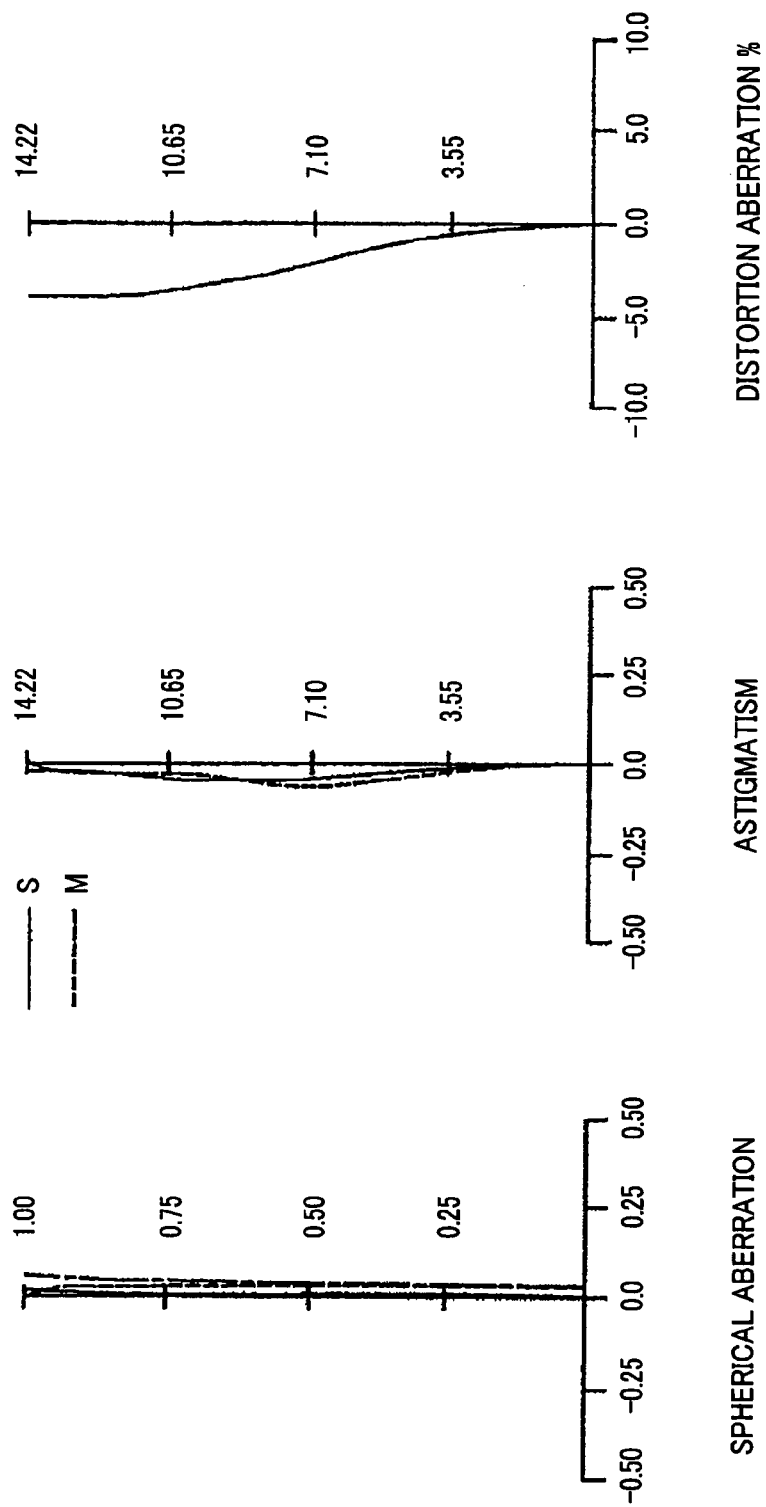
FIG. 6 shows, together with FIGS. 7 and 8, various aberration diagrams of a numerical value embodiment 2 in which practical numerical values are applied to a second embodiment of a zoom lens of the present invention, and this Figure shows spherical aberration, astigmatism and distortion aberration at the wide-angle end state.
Figure 7:
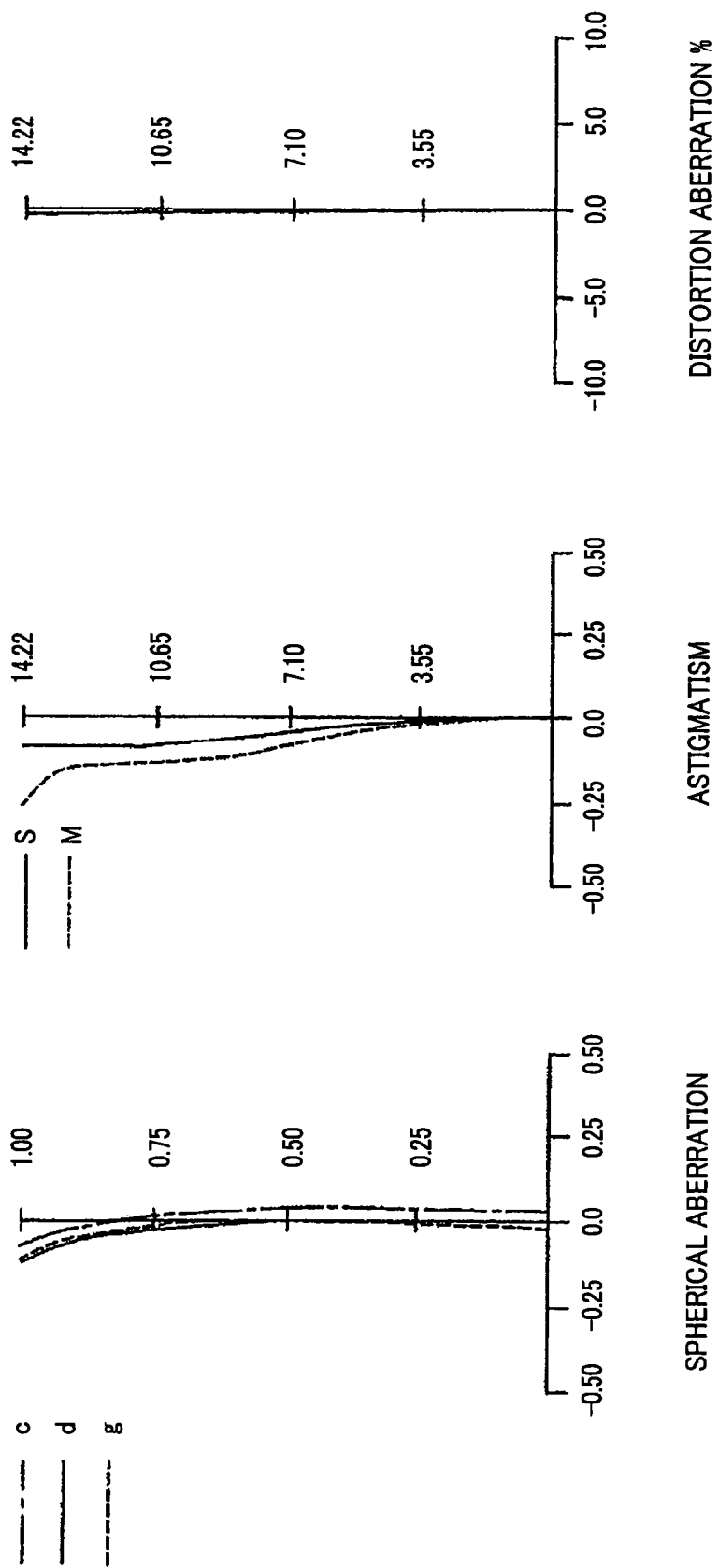
FIG. 7 shows spherical aberration, astigmatism and distortion aberration at the intermediate focal length.
Figure 8:
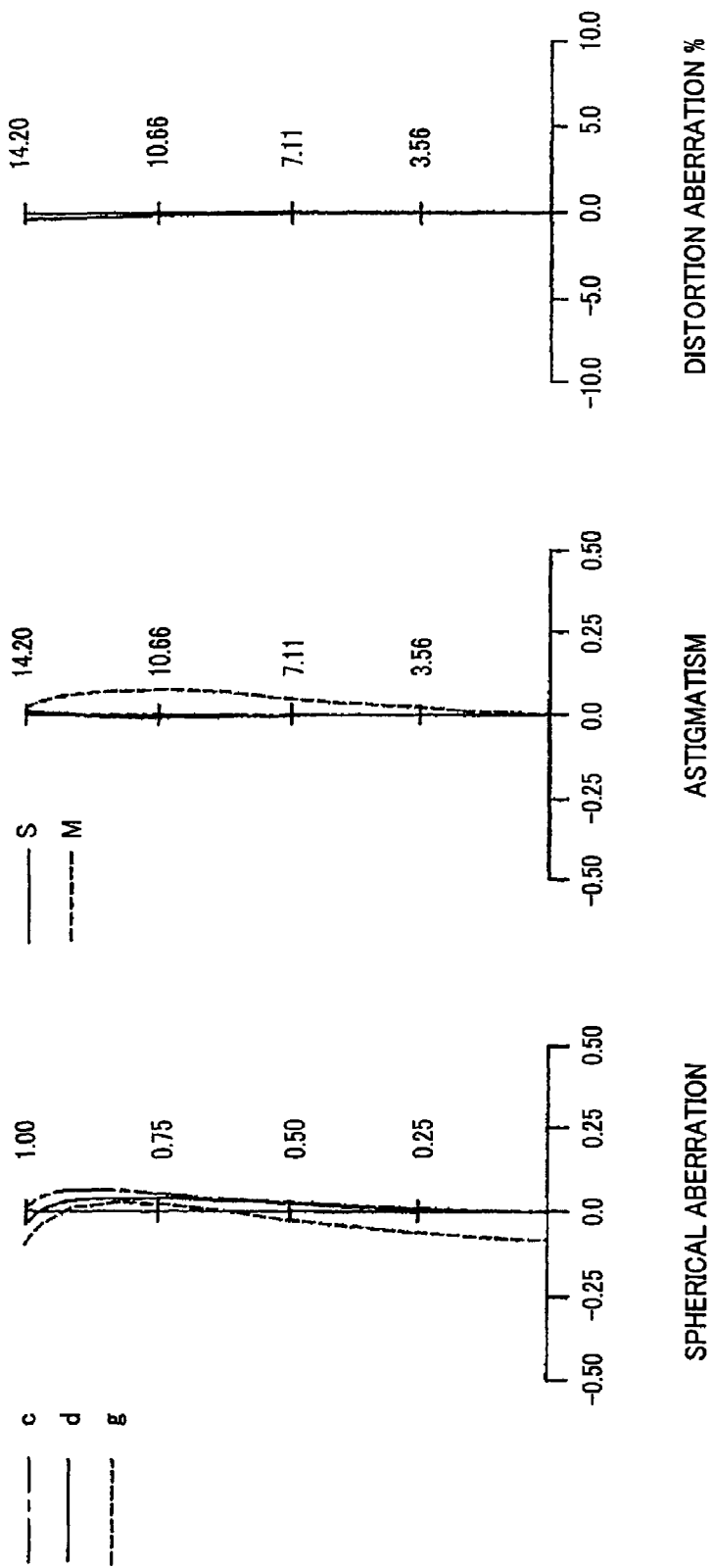
FIG. 8 shows spherical aberration, astigmatism and distortion aberration at the telescopic end state.

Various aberration diagrams in the infinity far in-focus state of the numerical value embodiment 2 are respectively shown in FIGS. 6 to 8. FIG. 6 shows various aberration diagrams at the wide-angle end state (f=14.42), FIG. 7 shows various aberration diagrams at the intermediate focal length (f=31.37) between the wide-angle end state and the telescopic end state, and FIG. 8 shows various aberration diagrams at the telescopic end state (f=68.25).

In the respective aberration diagrams of FIGS. 6 to 8, in the case of the spherical aberration, a ratio with respect to an open F value is taken on the ordinate and defocus is taken on the abscissa, wherein a solid line indicates a d line, single dotted lines indicate a C line, and a dotted line indicates spherical aberration at a g line. In the case of astigmatism, the ordinate indicates image height, the abscissa indicates focus, solid line S indicates sagittal image surface, and dotted lines M indicate meridional image surface. In the case of distortion aberration, the ordinate indicates image height, and the abscissa indicates %.

Figure 13:
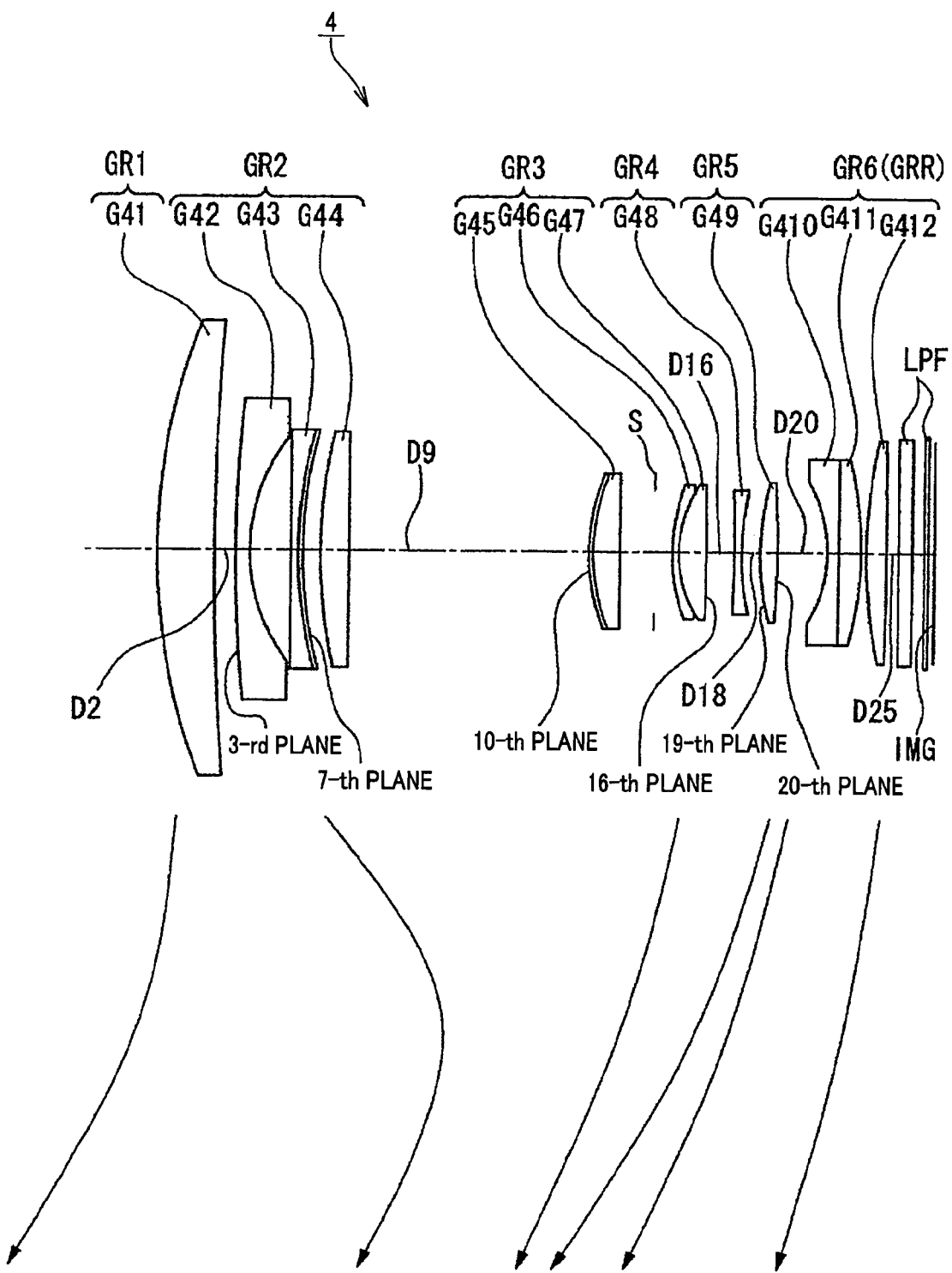
FIG. 13 is a view showing the lens configuration of a fourth embodiment of the zoom lens of the present invention.

In the numerical value embodiment 2, as shown in FIG. 13 which will be described later, the conditional formulas (1) to (8) are satisfied. Moreover, as shown in the respective aberration diagrams, respective aberrations are all corrected in a well-balanced manner at the wide-angle end state, the intermediate focal length between the wide-angle end state and the telescopic end state, and the telescopic end state.

Figure 9:
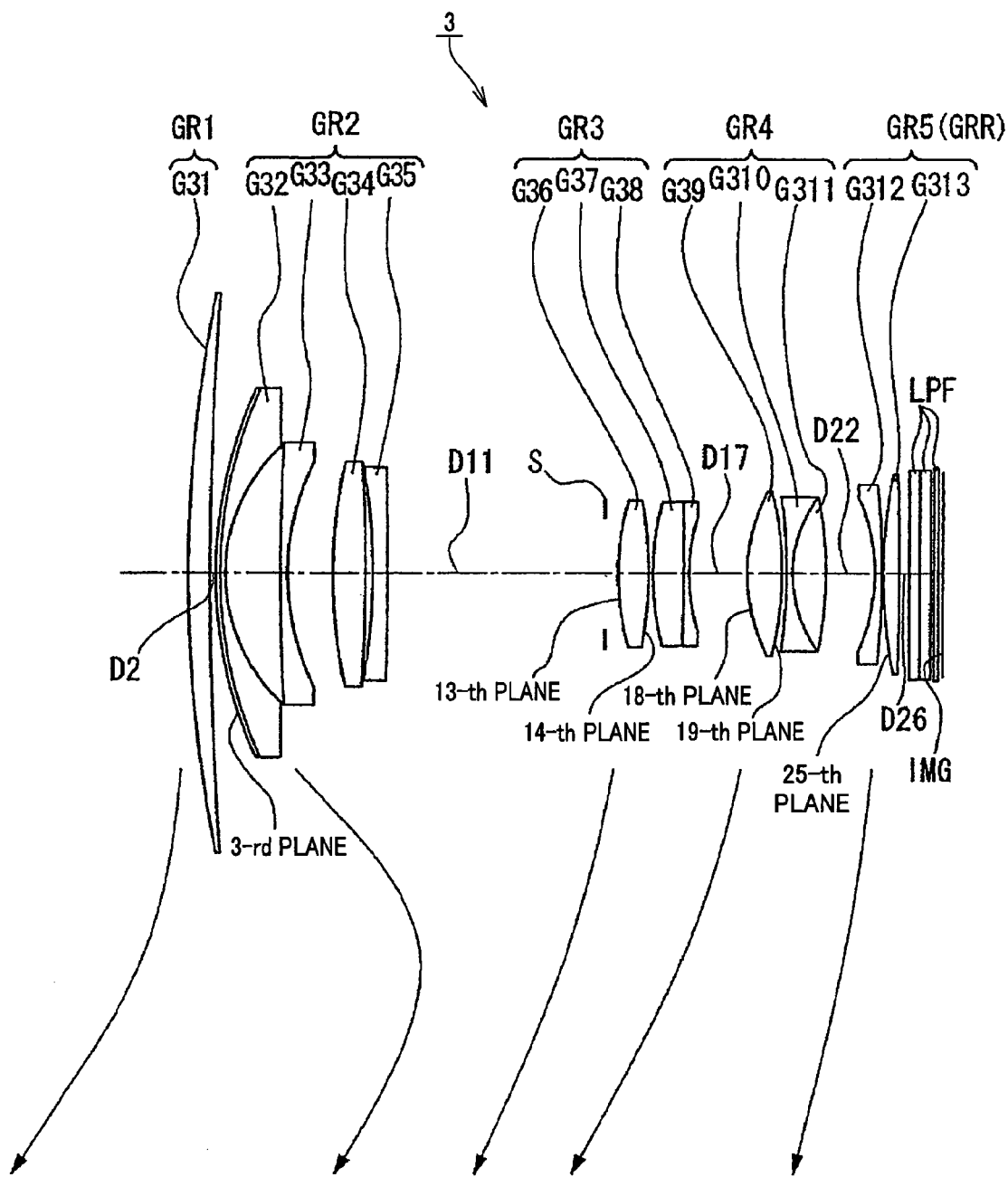
FIG. 9 is a view showing the lens configuration of a third embodiment of the zoom lens of the present invention.

FIG. 9 shows the lens configuration by the third embodiment 3 of the zoom lens of the present invention, wherein there are arranged in order a first lens group GR1 having positive refractive power, a second lens group GR2 having negative refractive power, a third lens group GR3 having positive refractive power, a fourth lens group GR4 having positive refractive power, and a fifth lens group GR5 having negative refractive power. Further, in a magnification changing or adjusting operation from the wide-angle end state up to the telescopic end state, respective lens groups are moved on the optical axis as indicated by an arrow solid travel line of FIG. 9.

The first lens group GR1 is comprised of single lens G31 having positive refractive power. The second lens group GR2 is composed of a negative lens G32 having a composite non-spherical surface at the object side, a negative lens G33, a positive lens G34, and a negative lens G35. The third lens group GR3 is composed of an iris S, a positive lens G36 having non-spherical surfaces at both its surfaces, and a connection lens of a positive lens G37 and a negative lens G38. The fourth lens group GR4 is composed of a positive lens G39 having non-spherical surfaces at both its surfaces, and a connection lens of a negative lens G310 and a positive lens G311. The fifth lens group GR5 is composed of a negative lens G312, and a positive lens G313 having a non-spherical surface at the object side.

Values of various elements of the numerical value embodiment 3 in which practical numerical values are applied to the above-mentioned third embodiment are shown in Table 7.

TABLE 7

| PLANE No. | R | | D | Nd | Vd |
|---|---|---|---|---|---|
| 1 | 143.348 | | 4.5 | 1.6968 | 55.46 |
| 2 | 373.253 | | variable | | |
| 3 | 79.544 | ASP | 0.2 | 1.5273 | 42.315 |
| 4 | 48.173 | | 1.6 | 1.883 | 40.805 |
| 5 | 19.849 | | 11.44 | | |
| 6 | 446.917 | | 1.2 | 1.835 | 42.984 |
| 7 | 27.807 | | 8.962 | | |
| 8 | 59.203 | | 6 | 1.9229 | 20.884 |
| 9 | −196.687 | | 1.641 | | |
| 10 | −53.186 | | 2.927 | 1.7725 | 49.624 |
| 11 | −200.818 | | variable | | |
| IRIS | INFINITY | | 2 | | |
| 13 | 24.772 | ASP | 6 | 1.4875 | 70.441 |
| 14 | −37.719 | ASP | 1 | | |
| 15 | 27.651 | | 6 | 1.497 | 81.608 |
| 16 | −319.491 | | 1 | 1.834 | 37.345 |
| 17 | 22.57 | | variable | | |
| 18 | 18.223 | ASP | 6.888 | 1.5247 | 56.238 |
| 19 | −26.379 | ASP | 0.8 | | |
| 20 | −50.637 | | 1.2 | 1.883 | 40.805 |
| 21 | 15 | | 6.84 | 1.4875 | 70.441 |
| 22 | −35.587 | | variable | | |
| 23 | −19.062 | | 1.2 | 1.8042 | 46.503 |
| 24 | −80 | | 0.5 | | |
| 25 | 55.153 | ASP | 3 | 1.8467 | 23.785 |
| 26 | −253.322 | | variable | | |
| 27 | INFINITY | | 2 | 1.5168 | 64.198 |
| 28 | INFINITY | | 2 | 1.5523 | 63.424 |
| 29 | INFINITY | | 1 | | |
| 30 | INFINITY | | 0.5 | 1.5567 | 58.649 |
| 31 | INFINITY | | 1 | | |
| i | INFINITY | | 0 | | |

In accordance with a change of the lens position state from the wide-angle end state up to the lens position state, a spacing D2 between the first lens group GR1 and the second lens group GR2, spacing D11 between the second lens group GR2 and the third lens group GR3, spacing D17 between the third lens group GR3 and the fourth lens group GR4, spacing D22 between the fourth lens group GR4 and the fifth lens group GR5, and spacing D26 between the fifth lens group GR5 and the low-pass filter LPF are changed. In view of the above, various values at the wide-angle end state of the respective spacings, the intermediate focal length between the wide-angle end state and the telescopic end state, and the telescopic end state are shown in Table 8 along with focal length f, F number Fno. and half picture angle ω.

TABLE 8

| f | 12.10 | 24.20 | 48.40 |
|---|---|---|---|
| Fno. | 2.85 | 3.66 | 5.03 |

TABLE 8-continued

| | | | |
|---|---|---|---|
| ω | 49.81 | 30.18 | 16.33 |
| D2 | 1.000 | 25.829 | 52.000 |
| D11 | 44.445 | 16.793 | 1.000 |
| D17 | 11.498 | 9.507 | 5.693 |
| D22 | 9.853 | 13.825 | 25.064 |
| D26 | 2.000 | 11.681 | 20.788 |

Respective lens plane surfaces of the third plane, the 13-th plane, the 14-th plane, the 18-th plane, the 19-th plane and the 25-th plane are constituted by non-spherical surfaces. Non-spherical coefficients are as shown in Table 9.

TABLE 9

| PLANE No. | K | $A^4$ | $A^6$ | $A^8$ | $A^{10}$ |
|---|---|---|---|---|---|
| 3 | 0.000E+00 | 1.02E−05 | −8.79E−09 | 1.03E−11 | −3.46E−15 |
| 13 | 0.000E+00 | −1.22E−05 | 1.66E−08 | −2.43E−10 | 1.31E−12 |
| 14 | 0.000E+00 | 7.35E−06 | 2.51E−08 | −2.59E−10 | 1.48E−12 |
| 18 | 0.000E+00 | −7.12E−06 | −2.49E−08 | 4.13E−11 | −5.99E−13 |
| 19 | 0.000E+00 | 1.94E−05 | −7.46E−09 | 7.91E−12 | 9.22E−14 |
| 25 | 0.000E+00 | −1.66E−06 | 2.72E−08 | −2.26E−10 | 7.31E−13 |

Figure 10:
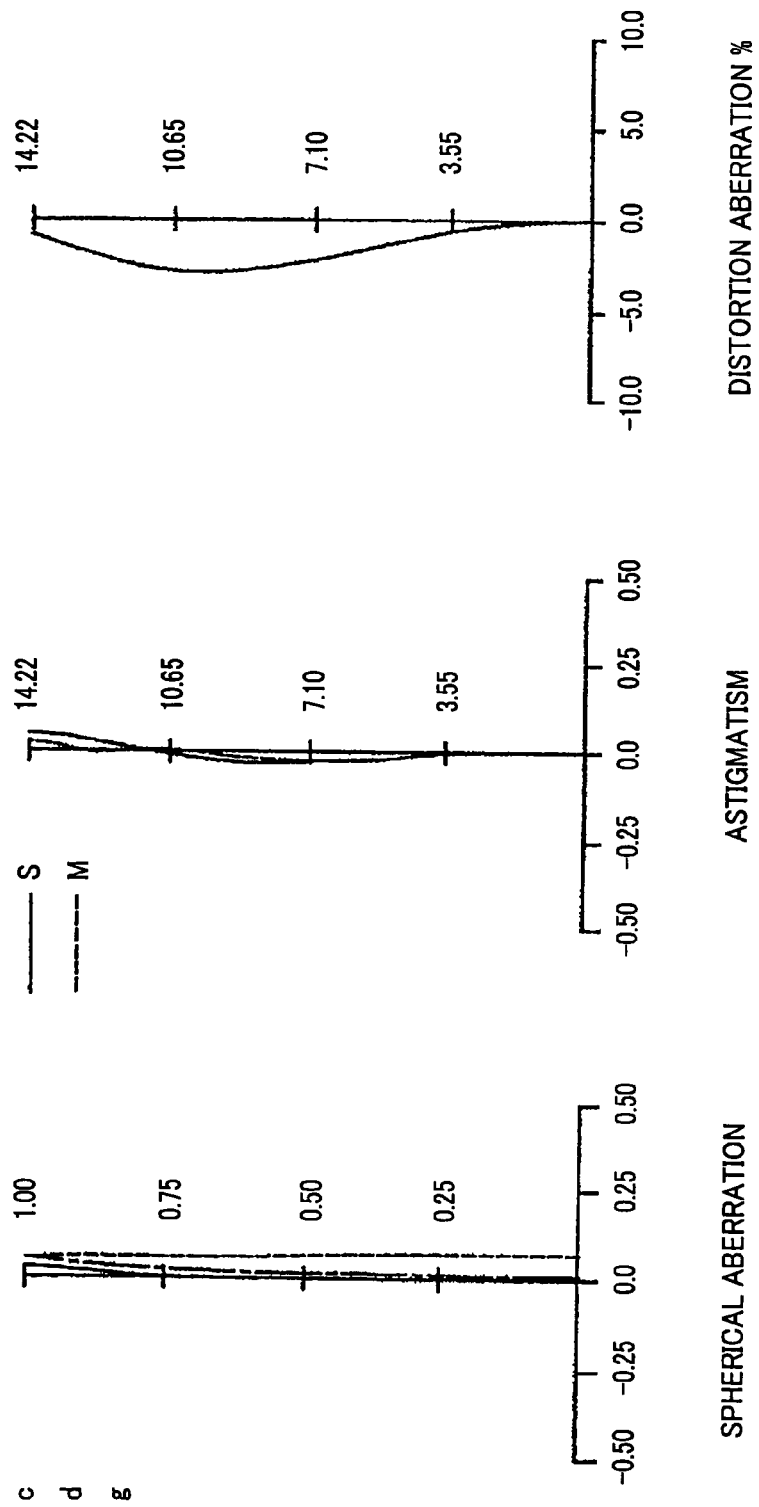
FIG. 10 shows, together with FIGS. 11 and 12, various aberration diagrams of a numerical value embodiment 3 in which practical numerical values are applied to the third embodiment of the zoom lens of the present invention, and this Figure shows spherical aberration, astigmatism and distortion aberration at the wide-angle end state.
Figure 11:
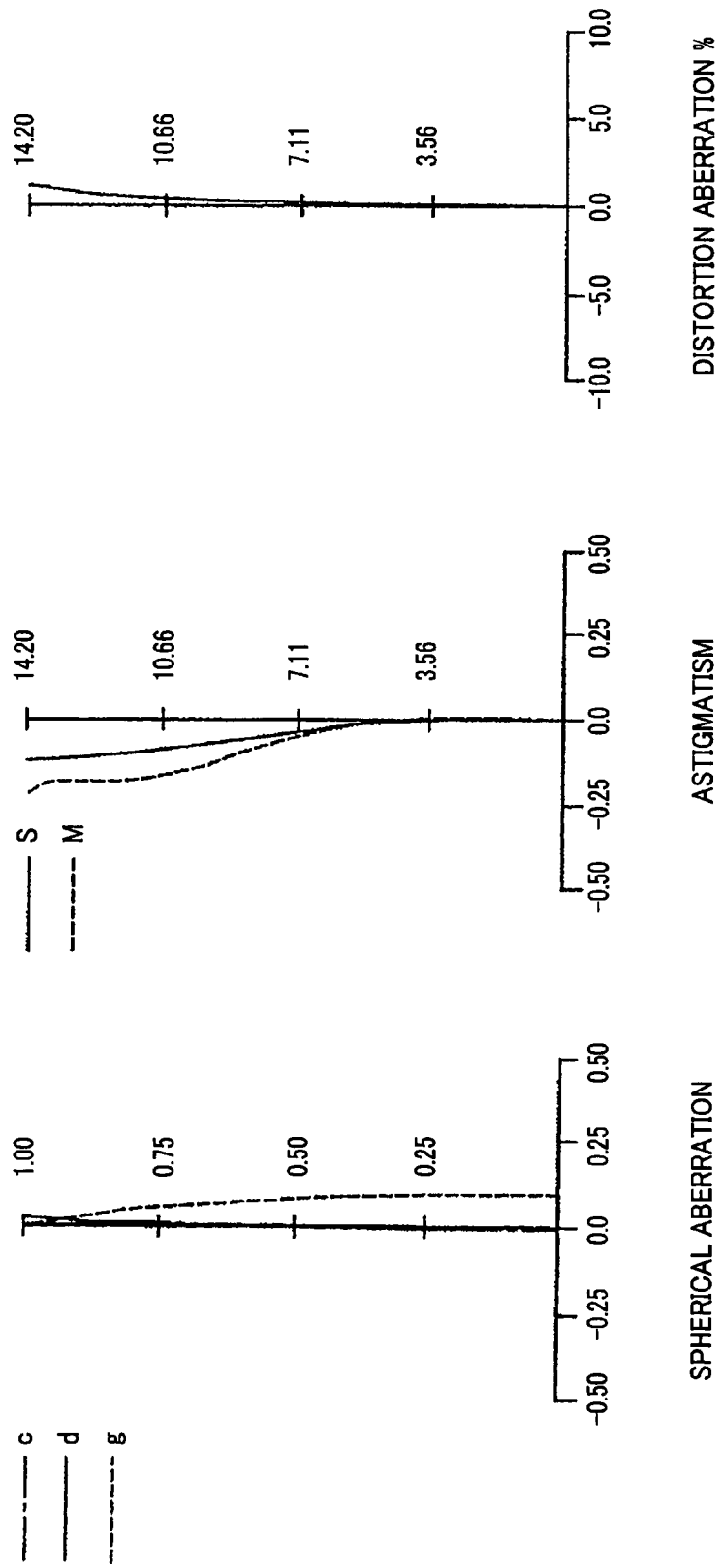
FIG. 11 shows spherical aberration, astigmatism and distortion aberration at the intermediate focal length.
Figure 12:
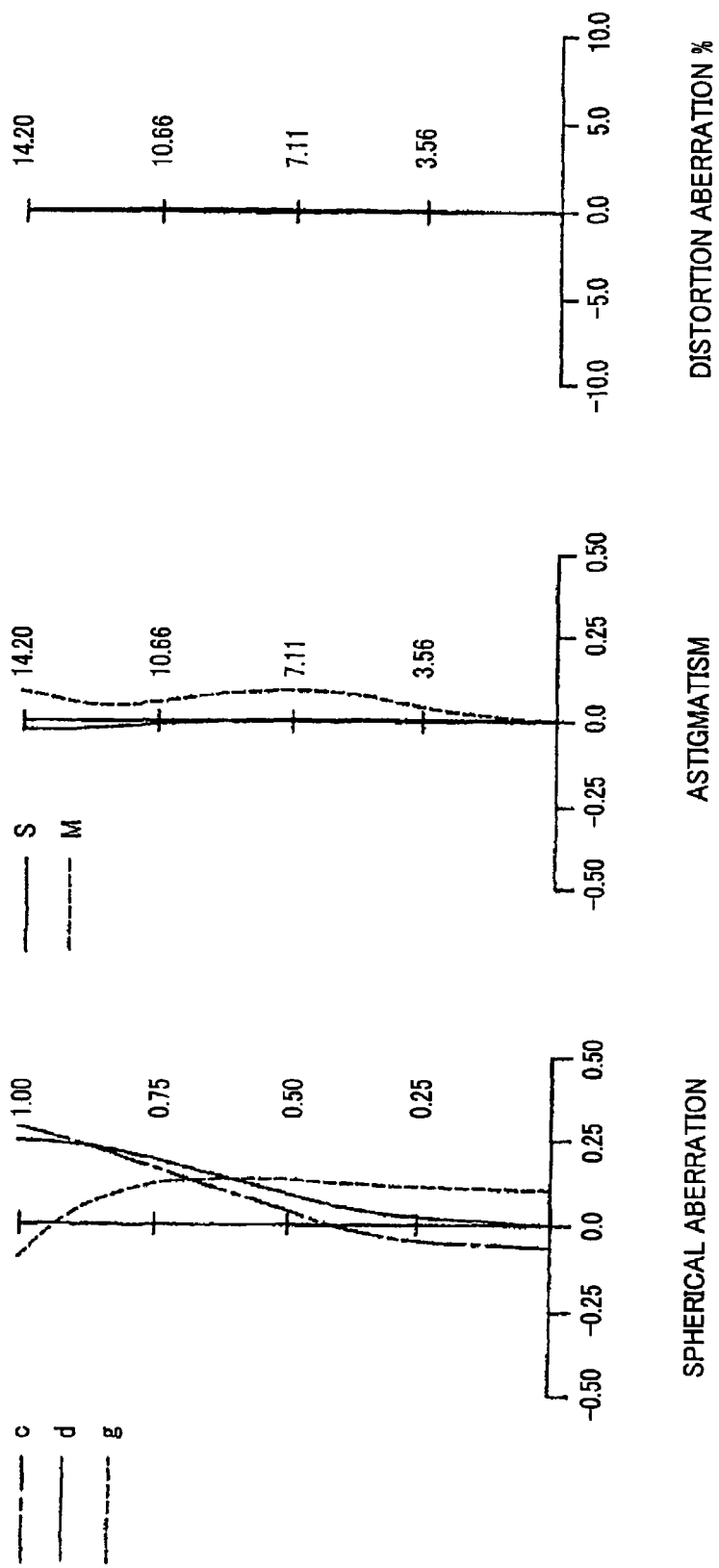
FIG. 12 shows spherical aberration, astigmatism and distortion aberration at the telescopic end state.

Various aberration diagrams in the infinity far in-focus state of the numerical value embodiment 3 are respectively shown in FIGS. 10 to 12, wherein FIG. 10 shows various aberration diagrams at the wide-angle end state (f=12.10), FIG. 11 shows various aberration diagrams at the intermediate focal length (f=24.20) between the wide-angle end state and the telescopic end state, and FIG. 12 shows various aberration diagrams at the telescopic end state (f=48.40).

In the respective aberration diagrams of FIGS. 10 to 12, in the case of spherical aberration, a ratio with respect to an open F value is taken on the ordinate, and defocus is taken on the abscissa, wherein solid line indicates spherical aberration at a d line, single dotted lines indicate spherical aberration at a C line, and a dotted line indicates spherical aberration at a g line. In the case of astigmatism, the ordinate indicates image height, the abscissa indicates focus, solid line S indicates a sagittal image surface, and dotted lines M indicate meridional image surface. In the case of distortion aberration, the ordinate indicates image height, and the abscissa indicates %.

In the numerical value embodiment 3, as shown in the Table 13 which will be described later, the conditional formulas (1) to (8) are satisfied. Moreover, as shown in the respective aberration diagrams, respective aberrations are corrected in a well-balanced manner at the wide-angle end state, the intermediate focal length between the wide-angle end state and the telescopic end state, and the telescopic end state.

FIG. 13 shows the lens configuration by the fourth embodiment 4 of the zoom lens of the present invention, wherein there are arranged, in order from the object side, a first lens group GR1 having positive refractive power, second lens group GR2 having negative refractive power, third lens group GR3 having positive refractive power, fourth lens group GR4 having negative refractive power, fifth lens group GR5 having positive refractive power, and a sixth lens group GR6 having negative refractive power. Further, in a magnification changing or adjusting operation from the wide-angle end state up to the telescopic end state, the respective lens groups are moved on the optical axis as indicated by arrowed solid travel line in FIG. 13.

The first lens group is comprised of a single lens G41 having positive refractive power. The second lens group GR2 is composed of a negative lens G42 having a non-spherical surface at the object side, a negative lens G43 having a composite non-spherical surface at the image pick-up surface side, and a positive lens G44. The third lens group GR3 is composed of a positive lens G45 having a composite non-spherical surface at the object side, an iris S, and a connection lens of a negative lens G46 and a positive lens G47 having non-spherical surfaces at the image pick-up surface side. The fourth lens group GR4 is comprised of a negative lens G48. The fifth lens group GR5 is comprised of a positive lens G49 having non-spherical surfaces at both surface sides. The sixth lens group GR6 is composed of a connection lens of a negative lens G410 and a positive lens G411, and a positive lens G412.

Values of various elements of the numerical value embodiment 4 in which practical numerical values are applied to the above-mentioned fourth embodiment are shown in Table 10.

TABLE 10

| PLANE No. | R | D | | Nd | Vd |
|---|---|---|---|---|---|
| 1 | 59.370 | | 9.000 | 1.6180 | 63.396 |
| 2 | 260.955 | | variable | | |
| 3 | 133.403 | ASP | 2.000 | 1.8350 | 42.984 |
| 4 | 17.570 | | 6.501 | | |
| 5 | 472.303 | | 1.700 | 1.8350 | 42.984 |
| 6 | 45.831 | | 0.200 | 1.5361 | 41.207 |
| 7 | 34.599 | ASP | 3.013 | | |
| 8 | 49.990 | | 4.185 | 1.9229 | 20.880 |
| 9 | 5000.000 | | variable | | |
| 10 | 19.172 | ASP | 0.200 | 1.5146 | 49.961 |
| 11 | 19.221 | | 4.635 | 1.4875 | 70.441 |
| 12 | −300.000 | | 5.000 | | |
| IRIS | INFINITY | | 3.250 | | |
| 14 | 20.595 | | 0.900 | 1.9037 | 31.312 |
| 15 | 11.395 | | 4.368 | 1.6230 | 58.122 |
| 16 | −60.206 | ASP | variable | | |
| 17 | −167.453 | | 1.000 | 1.9037 | 31.319 |
| 18 | 24.684 | | variable | | |
| 19 | 50.507 | ASP | 2.400 | 1.5831 | 59.461 |
| 20 | −51.079 | ASP | variable | | |
| 21 | −13.347 | | 1.800 | 1.8830 | 40.805 |
| 22 | −5000.000 | | 3.275 | 1.8467 | 23.785 |
| 23 | −36.845 | | 1.000 | | |
| 24 | 45.259 | | 3.088 | 1.9229 | 20.880 |
| 25 | −500.000 | | variable | | |
| 26 | INFINITY | | 2.010 | 1.5523 | 63.424 |
| 27 | INFINITY | | 2.100 | | |
| 28 | INFINITY | | 0.500 | 1.5567 | 58.649 |
| 29 | INFINITY | | 1.000 | | |
| i | INFINITY | | 0.000 | | |

In accordance with a change of the lens position state from the broad angle state up to the telescopic end state, a spacing D2 between the first lens group GR1 and the second lens group GR2, spacing D9 between the second lens group GR2 and the third lens group GR3, spacing D16 between the third lens group GR3 and the fourth lens group GR4, spacing D18 between the fourth lens group GR4 and the fifth lens group GR5, spacing D20 between the fifth lens group GR5 and the sixth lens group GR6, and spacing D25 between the sixth lens group GR6 and the low-pass filter LPF are changed. In view of the above, various values at the wide-angle end state of the respective spacings, the intermediate focal length between the wide-angle end state and the telescopic end state, and the telescopic end state are shown in Table 11 along with focal length f, F number Fno. and half picture angle ω.

TABLE 11

| f | 20.00 | 41.95 | 88.00 |
|---|---|---|---|
| Fno. | 2.89 | 3.52 | 4.66 |
| ω | 33.14 | 17.10 | 8.49 |
| D2 | 3.447 | 24.779 | 43.000 |
| D9 | 38.000 | 15.015 | 1.000 |
| D16 | 4.372 | 4.221 | 2.000 |
| D18 | 3.181 | 3.332 | 5.553 |
| D20 | 7.887 | 10.468 | 18.215 |
| D25 | 2.000 | 8.255 | 16.076 |

Respective lens plane surfaces of the third plane, the 7-th plane, the 10-th plane, the 16-th plane, the 19-th plane and the 20-th plane are constituted by non-spherical surfaces. Non-spherical coefficients are as shown in Table 12.

TABLE 12

| PLANE No. | K | $A^4$ | $A^6$ | $A^8$ | $A^{10}$ |
|---|---|---|---|---|---|
| 3 | 0.000E+00 | −7.08E−08 | −1.98E−10 | −3.45E−12 | −1.17E−15 |
| 7 | −1.092E−01 | −1.09E−05 | −4.70E−08 | 1.86E−10 | −8.70E−13 |
| 10 | 0.000E+00 | −1.41E−05 | −2.15E−08 | −1.68E−10 | 7.12E−13 |
| 16 | 2.549E−01 | 2.68E−05 | −1.25E−07 | 7.04E−10 | −5.36E−12 |
| 19 | 0.000E+00 | 7.99E−05 | 2.45E−07 | −1.77E−10 | 5.78E−11 |
| 20 | 0.000E+00 | 4.90E−05 | 3.26E−07 | −8.57E−10 | 7.3256E−11 |

Figure 14:
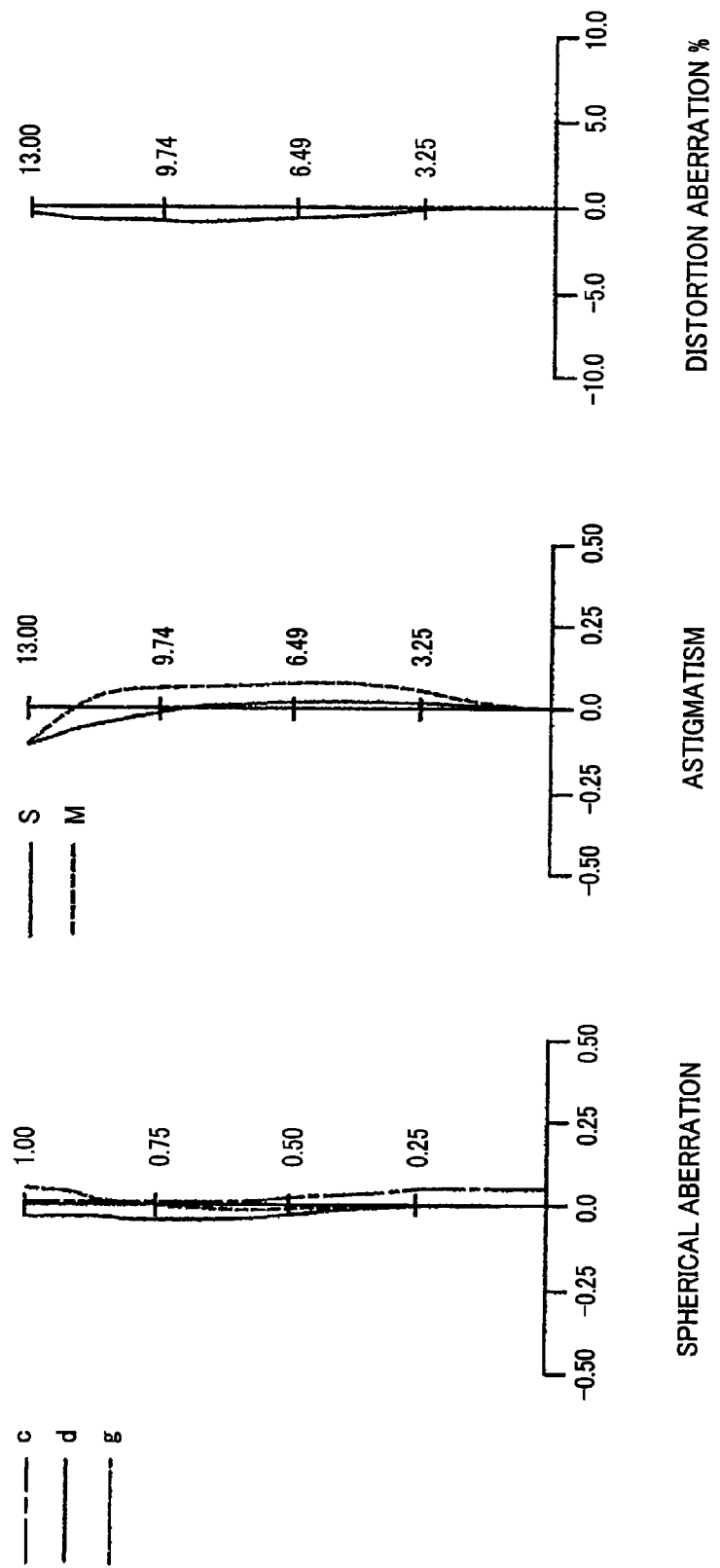
FIG. 14 shows, along with FIGS. 15 and 16, various aberration diagrams of a numerical value embodiment 4 in which practical numerical values are applied to the fourth embodiment of the zoom lens of the present invention, and this Figure shows spherical aberration, astigmatism and distortion aberration at the wide-angle end state.
Figure 15:
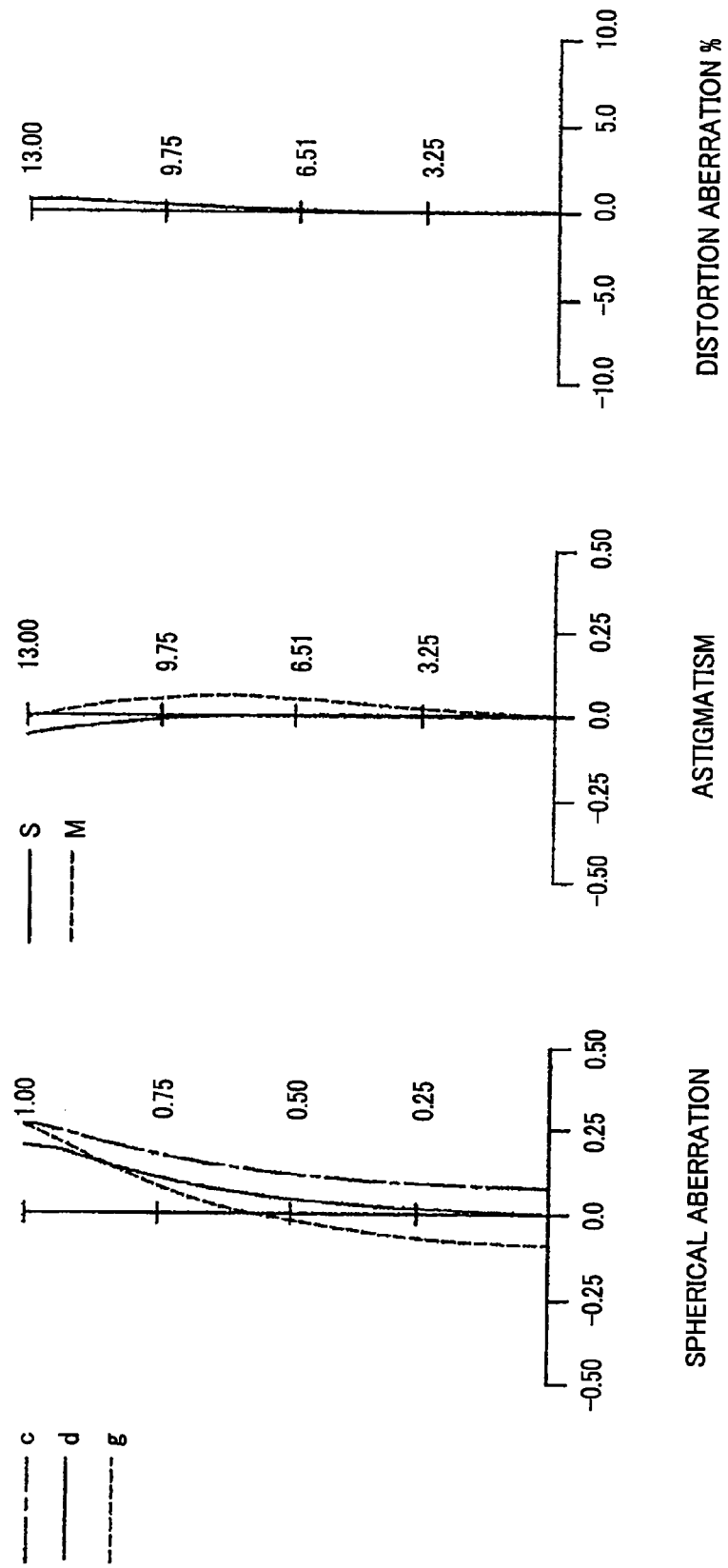
FIG. 15 shows spherical aberration, astigmatism and distortion aberration at the intermediate focal length.
Figure 16:
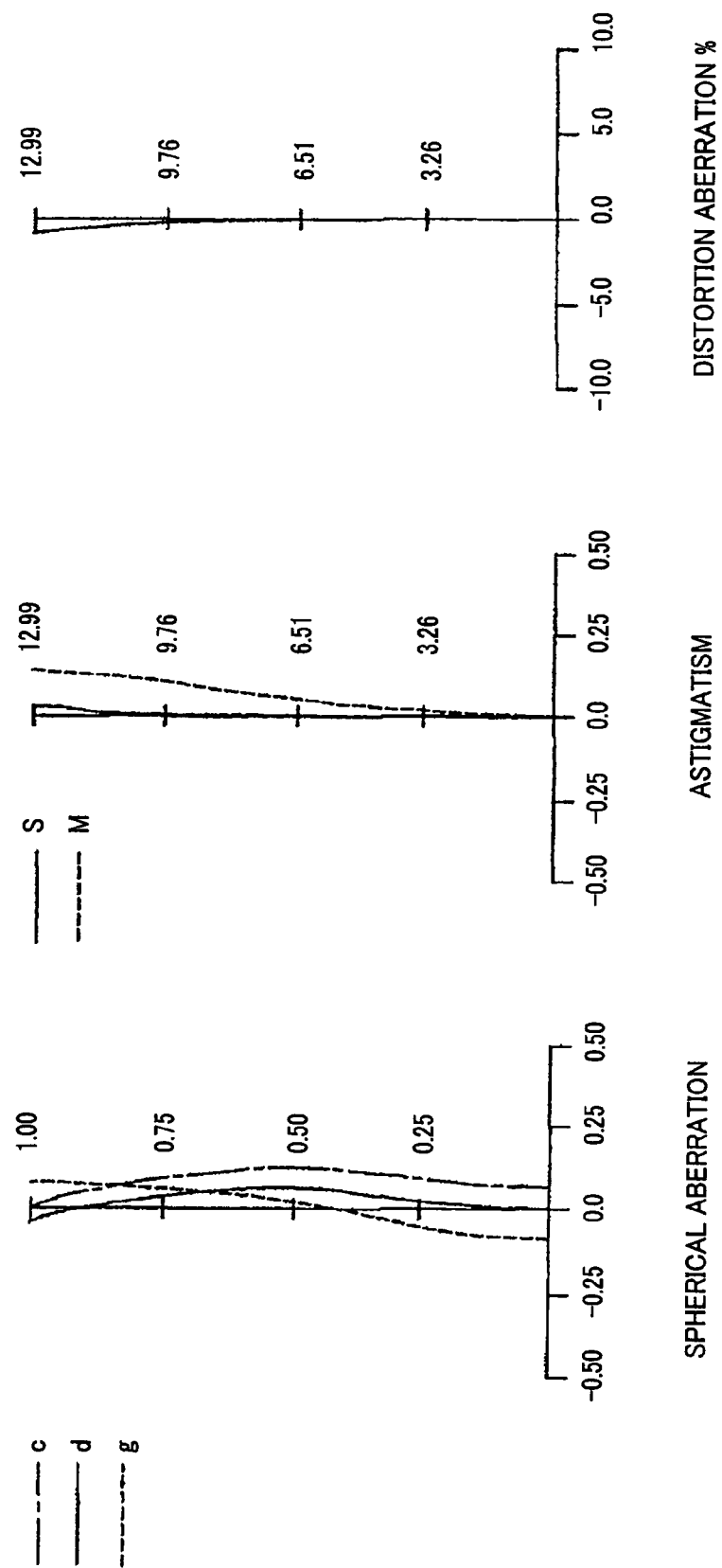
FIG. 16 shows spherical aberration, astigmatism and distortion aberration at the telescopic end state.

Various aberration diagrams in the infinity far in-focus state of the numerical value embodiment 4 are respectively shown in FIGS. 14 to 16, wherein FIG. 14 shows various aberration diagrams at the wide-angle end state (f=20.00), FIG. 15 shows various aberration diagrams at the intermediate focal length (f=41.95) between the wide-angle end state and the telescopic end state, and FIG. 16 shows various aberration diagrams at the telescopic end state (f=88.00).

In the respective aberration diagrams of FIGS. 14 to 16, in the case of the spherical aberration, a ratio with respect to an open F value is taken on the ordinate and defocus is taken on the abscissa, wherein a solid line indicates spherical aberration at a d line, single dotted lines indicate spherical aberration at a C line, and dotted lines indicate spherical aberration at a g line. In the case of astigmatism, the ordinate indicates image height, the abscissa indicates focus, solid line S indicates a sagittal image surface, and dotted lines indicate meridional image surfaces. In the case of distortion aberration, the ordinate indicates image height, and the abscissa indicates %.

In the numerical value embodiment 4, as shown in the Table 13 which will be described later, the conditional formulas (1) to (8) are satisfied. Moreover, respective aberrations are all corrected in a well-balanced manner at the wide-angle end state, the intermediate focal length between the wide-angle end state and the telescopic end state, and the telescopic end state.

TABLE 13

| Numeric Value Embodiment | Conditional Formula | | | | |
|---|---|---|---|---|---|
| | (1) YMAX/Fw | (2) VdG1 | (3) F1/√Fw · FT | (4) BGRRT | (5) Twbf/fw |
| 1 | 0.874 | 70.441 | 5.076 | 1.533 | 0.452 |
| 2 | 0.985 | 70.441 | 6.754 | 1.586 | 0.688 |
| 3 | 1.174 | 55.460 | 13.838 | 1.392 | 0.573 |
| 4 | 0.650 | 63.396 | 2.904 | 1.483 | 0.336 |

| Numeric Value Embodiment | Conditional Formula | | | |
|---|---|---|---|---|
| | (6) VdGRRn | (6) VdGRRp | (7) \|F2/√Fw · FT\| | (8) VdGR3p |
| 1 | 37.3451 | 20.8835 | 0.723 | 59.460 |
| 2 | 46.5025 | 23.7848 | 0.593 | 70.534 |
| 3 | 46.5025 | 23.7848 | 0.820 | 76.025 |
| 4 | 40.8054 | 20.8804 | 0.598 | 64.282 |

It is to be noted that while respective lens groups of zoom lenses shown in the respective embodiments are constituted only by a refraction type lens for deflecting rays of incident light by refraction (i.e., lens of the type in which deflection is performed at the interface or surface between media having different refractive indices), respective lens groups may be constituted, without being limited to the above mentioned implementation, by, e.g., a diffraction type lens for deflecting rays of incident light by refraction, refraction-diffraction hybrid type lens for deflecting rays of incident light by a combination of diffracting action and refracting action, and/or refractive index distribution type lens for deflecting rays of incident light by refractive index distribution within a medium, etc.

Moreover, a plane having no optical power (e.g., a reflection plane surface, refraction plane surface, diffraction plane surface) may be provided within an optical path to bend or fold the optical path before and after the zoom lens or in the middle thereof. A bending position may be set as occasion demands. By suitable bending of optical path, it is possible to attain realization of a superficial thin structure of camera.

Moreover, one or plural lens groups, or a portion of one lens group may be shifted in a direction substantially perpendicular to the optical axis among the lens groups constituting the zoom lens to thereby have ability to shift image. A detection system for detecting vibration or movement of the camera, a drive system for shifting the lens group, and a control system for giving shift quantity to the drive system in accordance with an output of the detection system may be combined to have thereby an ability to allow such combined system to function as a vibration proof optical system.

Figure 17:
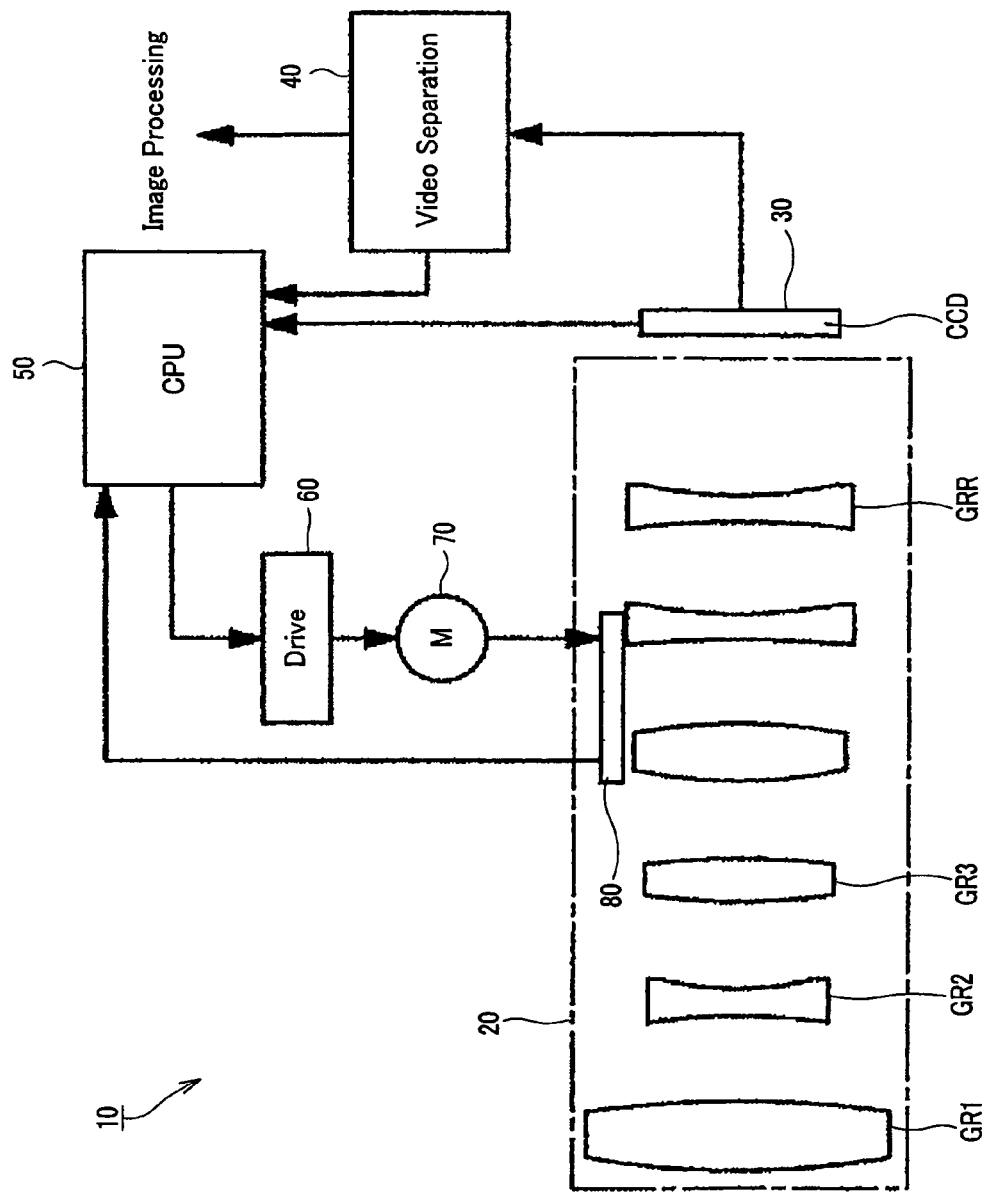
FIG. 17 is a block diagram showing an embodiment of an image pick-up apparatus of the present invention.

The embodiment of the image pick-up apparatus of the present invention is shown in FIG. 17.

The image pick-up apparatus 10 comprises a zoom lens 20, and includes an image pick-up device 30 for converting an optical image formed by the zoom lens 20 into an electric signal. In this example, as the image pick-up device 30, there can be applied photo-electric converting devices using, e.g., CCD (Charge Coupled Device) or CMOS (Complementary Metal-Oxide Semiconductor), etc. The zoom lens according to the present invention can be applied to the zoom lens 20. In FIG. 17, respective lens groups of the zoom lens 1 according to the first embodiment shown in FIG. 1 are illustrated as a single lens in a simplified manner. It is a matter of course that not only the zoom lens according to the first embodiment, but also the zoom lenses according to the second and third embodiments and/or the zoom lens of the present invention constituted by the embodiments except for the embodiments shown in this specification may be used.

An electric signal formed by the image pick-up device 30 is separated by a video separation circuit 40. Thus, a focus control signal is sent to a control circuit 50, and a video signal is sent to a video processing circuit. The signal which has been sent to the video processing circuit is processed so as to take a form suitable for processing subsequent thereto. The processed signal thus obtained is caused to undergo various processing such as display by a display unit, recording onto recording medium and/or transfer by communication means, etc.

The control circuit 50 is supplied with an operation signal from the external, e.g., operation of zoom button, etc. so that various processings are performed in accordance with the operation signal. For example, when a focus command by the zoom button is inputted, a drive unit 70 is caused to become operative through a drive circuit 60 in order that there results a focal length state based on the command to move the respective lens groups to a predetermined position. Position information of the respective lens groups which have been obtained by respective sensors 80 are inputted to the control circuit 50. The position information thus inputted is referred in outputting a command signal to the driver circuit 60. Moreover, the control circuit 50 serves to check a focus state on the basis of a signal sent from the video separation circuit 40 to conduct a control such that that optimum focus state can be obtained.

The above-mentioned image pick-up apparatus 10 may take various forms as practical products. For example, the image pick-up apparatus 10 can be widely applied as a camera unit, etc. of digital input/output equipment such as a digital still camera, digital video camera, mobile telephone in which camera is assembled or incorporated and/or PDA (Personal Digital Assistant) in which a camera is assembled or incorporated, etc.

It is to be noted that all of the practical shapes and numerical values of respective components shown in the above-described respective embodiments and numeric embodiments only illustrate mere examples of embodiments in carrying out the present invention, and technical field of the present invention should not be restrictively interpreted by those implementations.

INDUSTRIAL APPLICABILITY

It is possible to provide a zoom lens including a broad picture angle of 60 to 100 degrees as a photographic picture angle of the wide-angle end state, and having the magnification ratio of about three times to six times, small front gem diameter, excellent compactness and high image formation performance, and image pick-up apparatus using such zoom lens system. The zoom lens and the image pick-up apparatus using such zoom lens can be widely utilized for digital video camera and/or digital still camera, etc.

The invention claimed is:

1. A zoom lens consisting of plural groups and serving to change group spacing or spacings to thereby perform magnification changing or adjusting operation, the zoom lens comprising a first lens group GR1 having positive refractive power, a second lens group GR2 having negative refractive power and a third lens group GR3 having positive refractive power which are arranged in order from the object side, and a last lens group GRR arranged at the side closest to image surface and having negative refractive power, wherein the first lens group GR1 is constituted by single positive lens, and satisfies the following conditional formulas (1), (2)

$$0.5 < Y\max/FW < 1.3 \quad (1)$$

$$VdG1 > 40 \quad (2)$$

wherein in the above formulas,

Ymax: maximum image height on an image pick-up surface;

FW: focal length at the wide-angle end state of the entire lens system; and

VdG1: Abbe number at d line of the first lens group GR1, wherein the first lens group GR1 satisfies the following conditional formula (3)

$$2 < F1/\sqrt{FW \cdot FT} < 15 \quad (3)$$

wherein in the above formula,

F1: focal length of the first lens group GR1;

FT: focal length at the telescopic end state of the entire lens system; and $\sqrt{FW \cdot FT}$: square root of product of FW and FT and wherein the last lens group GRR includes a negative lens GRn at the side closest to the object, and a positive lens GRp at the side closest to the image surface, and satisfies the following conditional formulas (4), (5) and (6)

$$1.2 < \beta GRRT < 1.8 \quad (4)$$

$$0.2 < Twbf/FW < 1.2 \quad (5)$$

$$VdGRRn > VdGRRp \quad (6)$$

wherein in the above formulas,

βGRRT: magnification at the telescopic end state of the last lens group GRR;

Twbf: back focus (air conversion length) at the wide-angle end state;

VdGRRn: Abbe number at a d line of the negative lens GRn; and

VdGRRp: Abbe number at a d line of the positive lens GRp.

2. The zoom lens according to claim 1, wherein at least one lens plane surface of the second lens group GR2 is constituted by a non-spherical surface, and the second lens group GR2 satisfies the following conditional formula (7)

$$0.4 < |F2/\sqrt{FW \cdot FT}| < 1.0 \quad (7)$$

wherein in the above formula,

F2: focal length of the second lens group GR2.

3. The zoom lens according to claim 1, wherein the third lens group GR3 at least includes one positive lens, and one negative lens, at least one lens plane surface of the respective lens plane surfaces is constituted by a non-spherical surface, and the third lens group GR3 satisfies the following conditional formula (8)

$$VdGR3p > 50 \quad (8)$$

wherein in the above formula,

VdGR3$p$: average value of Abbe numbers at a d line of the positive lens within the third lens group GR3.

4. An image pick-up apparatus comprising a zoom lens consisting of plural groups and serving to change group spacing or spacings to thereby perform magnification changing or adjusting operation, and an image pick-up device for converting an optical image formed by the zoom lens into an electric signal, wherein the zoom lens comprises a first lens GR1 having positive refractive power, a second lens group GR2 having negative refractive power and a third lens group GR3 having positive refractive power which are arranged in order from the object side, and a last lens group GRR arranged at the side closest to the image surface and having negative refractive power, and the first lens group GR1 is constituted by single positive lens, and satisfies the following conditional formulas (9), (10)

$$0.5 < Y\max/Fw < 1.3 \quad (9)$$

$$VdG1 > 40 \quad (10)$$

wherein in the above formula,

Ymax: maximum image height on image pick-up surfaces

FW: focal length at the wide-angle end state of the lens entire system; and

VdG1: Abbe number at a d line of the first lens group GR1, wherein the first lens group GR1 satisfies the following conditional formula (11)

$$2 < F1/\sqrt{FW \cdot FT} < 15 \quad (11)$$

wherein in the above formula

F1: focal length of the first lens group GR1

FT: focal length at the telescopic end state of the entire lens system; and $\sqrt{FW \cdot FT}$: square root of product of FW and FT, and wherein the last lens group GRR includes a negative lens GRn at the side closest to the object, and a positive lens GRp at the side closest to the image surface, and satisfies the following conditional formulas (12), (13) and (14)

$$1.2 < \beta GRRT < 1.8 \quad (12)$$

$$0.2 < |Twbf/FW| < 1.2 \quad (13)$$

$$VdGRRn > VdGRRp \quad (14)$$

wherein in the above formula $\beta$GRRT: magnification at the telescopic end state of the last lens group GRR;

Twbf: back focus (air conversion length) at the wide-angle end state

VdGRRn: Abbe number at d line of the negative lens GRn; and

VdGRRp: Abbe number at d line of the positive lens GRp.

5. The image pick-up apparatus according to claim 4, wherein at least one lens plane surface of the second lens group GR2 is constituted by non-spherical surface, and the second lens group GR2 satisfies the following conditional formula (15)

$$0.4 < |F2/\sqrt{FW \cdot FT}| < 1.0 \quad (15)$$

wherein in the above formula,

F2: focal length of the second lens group GR2.

6. The image pick-up apparatus according to claim 4, wherein the third lens group GR3 at least includes one positive lens and one negative lens, at least one lens plane surface of the respective lens plane surfaces is constituted by a non-spherical surface, and the third lens group GR3 satisfies the following conditional formula (16)

$$VdGR3p > 50 \quad (16)$$

wherein in the above formula,

VdGR3$p$: average value of Abbe numbers at d line of the positive lens within the third lens group GR3.

* * * * *